United States Patent
Li et al.

(10) Patent No.: US 12,556,416 B2
(45) Date of Patent: Feb. 17, 2026

(54) METHOD AND SYSTEM FOR ATOMIC, CONSISTENT AND ACCOUNTABLE CROSS-CHAIN REWRITING

(71) Applicant: Jinan University, Guangzhou (CN)

(72) Inventors: Ming Li, Guangzhou (CN); Yongdong Wu, Guangzhou (CN); Jian Weng, Guangzhou (CN); Jiasi Weng, Guangzhou (CN); Jianan Liu, Guangzhou (CN); Zhihang Zhou, Guangzhou (CN); Jiahui Lin, Guangzhou (CN)

(73) Assignee: Jinan University, Guangzhou (CN)

( * ) Notice: Subject to any disclaimer, the term of this patent is extended or adjusted under 35 U.S.C. 154(b) by 147 days.

(21) Appl. No.: 18/430,485

(22) Filed: Feb. 1, 2024

(65) Prior Publication Data

US 2024/0223388 A1  Jul. 4, 2024

Related U.S. Application Data

(60) Provisional application No. 63/593,848, filed on Oct. 27, 2023.

(51) Int. Cl.
 *H04L 9/00* (2022.01)
(52) U.S. Cl.
 CPC ...................................... *H04L 9/50* (2022.05)
(58) Field of Classification Search
 CPC ..... H04L 9/50; H04L 67/1095; H04L 9/0891; G06F 16/9027
 See application file for complete search history.

(56) References Cited

U.S. PATENT DOCUMENTS

2021/0067321 A1\*  3/2021  Lu ....................... G06F 16/9027
2023/0073337 A1\*  3/2023  Chan .................... G06Q 20/405

OTHER PUBLICATIONS

Roberto Casado-Vara et al., "How blockchain improves the supply chain: Case study alimentary supply chain", Procedia computer science, 2018, vol. 134, pp. 393-398.
Dominic Deuber et al., "Redactable blockchain in the permissionless setting", 2019 IEEE Symposium on Security and Privacy, 2019, pp. 124-138.
Giuseppe Ateniese et al., "Redactable blockchain-or-rewriting history in bitcoin and friends", 2017 IEEE European Symposium on Security and Privacy, 2017, pp. 111-126.

\* cited by examiner

*Primary Examiner* — Olugbenga O Idowu

(57) ABSTRACT

A method and system for atomic, consistent and accountable cross-chain rewriting are provided. The method is applicable for a blockchain network comprising a set of correlative blockchains. The method includes: in response to a user redaction proposal for any of the correlative blockchains, generating a set of correlative redaction proposals that involve all related transactions depending on a target transaction to be redacted by the user redaction proposal, based on a transaction dependency graph representing a dependency relationship of transactions, wherein at least one of the transactions in the transactions is to be redacted by the user redaction proposal; validating the user redaction proposal and the correlative redaction proposals, according to a predefined cross-chain redaction policy; calling the correlative blockchains for executing the validated redaction proposals; and updating the transaction dependency graph in response to execution of the validated redaction proposals.

18 Claims, 12 Drawing Sheets

METHOD AND SYSTEM FOR ATOMIC, CONSISTENT AND ACCOUNTABLE CROSS-CHAIN REWRITING

CROSS-REFERENCE TO RELATED APPLICATIONS

This application claims the benefit of U.S. Provisional Application No. 63/593,848, filed on Oct. 27, 2023. The content of the aforementioned application, including any intervening amendments made thereto, is incorporated herein by reference in its entirety.

FIELD

This disclosure is related to the blockchain technology, and in particular, to a method and a system for atomic, consistent and accountable cross-chain rewriting.

BACKGROUND

Over the past few years, blockchain has drawn significant attention from both academy and industry. Blockchain is a novel paradigm where distrustful parties make transactions and manage data without involving a trustworthy third-party. Blockchain technology has been envisioned as a promising paradigm that will give rise to the reconstruction of the underlying Internet. It is regarded as a flagship technology to realize trustful public bulletin boards, bringing immutability and transparency into practical scenarios, without relying on any trusted party. Blockchain achieves tamper-resistance and traceability for the transactions, offering anonymity and decentralization for the parties.

Due to these features, blockchain can be applied to a wide spectrum of applications, such as cryptocurrency, supply chain, data storage, financial services, distributed learning, digital right management, crowd-sourcing systems, Vehicular Ad Hoc Networks (VANETs), network slicing service or the like.

Presently, the debate about blockchain immutability have gained considerable attention. More concretely, the immutability of blockchain results in several harmful data to be recorded permanently. Furthermore, as the advent of the new the General Data Protection Regulation (GPDR), "the-right-to-be-forgotten" has been essentially incompatible with current immutable blockchain proposals. Within this regulation, one has the right to remove his/her personal data under some circumstances. On the other hand, human errors and carelessness are inevitable in reality, and therefore a number of vulnerable smart contracts have been deployed in blockchains and caused catastrophic incidents.

Although several remedy solutions have been proposed, they either introduced community debate or caused high costs in underlying blockchain. Furthermore, existing solutions for implementing rewriting of blockchain are still immature and mostly concerned about designing rewriting policies, especially for a single chain. There are limitations when they are used in the scenario with multi-chain involvement. More concretely, since a number of distinct blockchain systems have been deployed in practice, solutions only considering a single chain are inadequate.

Therefore, there's need for new approaches for the data rewriting in the scenario with multi-chain involvement.

SUMMARY OF THE INVENTION

In a first aspect of the disclosure, there is provided a computer-implemented method for atomic, consistent and accountable cross-chain rewriting, applicable for a blockchain network comprising a set of correlative blockchains. The method comprising: in response to a user redaction proposal for any of the correlative blockchains, generating a set of correlative redaction proposals that involve all related transactions depending on a target transaction to be redacted by the user redaction proposal, based on a transaction dependency graph representing a dependency relationship of transactions, wherein at least one of the transactions in the transactions is to be redacted by the user redaction proposal; validating the user redaction proposal and the correlative redaction proposals, according to a predefined cross-chain redaction policy; calling the correlative blockchains for executing the validated redaction proposals; and updating the transaction dependency graph in response to execution of the validated redaction proposals.

In an embodiment, the method further comprises monitoring candidate redaction proposal pools for the correlative blockchains, to detect the user redaction proposal.

In an embodiment, the method further comprises in response to a cross-chain communication enabled smart contract, determining transactions involved by the cross-chain communication enabled smart contract; executing the cross-chain communication enabled smart contract by executing the transactions involved by the cross-chain communication enabled smart contract in a set of blockchains; and determining the set of blockchains as the set of correlative blockchains, wherein the user redaction proposal is aimed for redacting one of the transactions involved by the cross-chain communication enabled smart contract.

In an embodiment, the transaction dependency graph specifies dependency and execution order of the transactions involved by the cross-chain communication enabled smart contract.

In an embodiment, the method further comprises generating a global state mapping of the set of correlative blockchains, based on a set of original states associated with the set of correlative blockchains before executing the cross-chain communication enabled smart contract and a set of transformed states associated with the set of correlative blockchains after executing the cross-chain communication enabled smart contract.

In an embodiment, the method further comprises: for any one of the validated redaction proposals, rejecting the redaction proposal if the redaction proposal triggers changing in the global state mapping of the set of correlative blockchains.

In an embodiment, the method further comprises: constructing an intermediary blockchain, wherein the intermediary blockchain comprises a monitor node configured for monitoring candidate redaction proposal pools for the correlative blockchains to detect the user redaction proposal, a proposer node configured for generating the set of correlative redaction proposals, and a validator node configured for generating new blocks of the intermediary blockchain by collecting transactions uploaded by the monitor and the proposer.

In an embodiment, generating the set of correlative redaction proposals that involve all related transactions depending on the user redaction proposal comprises: determining the target transaction for which the user redaction proposal is directed to; determining a first sub-transaction of the target transaction from the transaction dependency graph and determining a first blockchain associated with the first sub-transaction, wherein execution of the first sub-transaction depends on execution of the target transaction; deducing a first redaction transaction corresponding to the first sub-transaction; and generating a first redaction proposal based on the first redaction transaction and the first blockchain.

In an embodiment, the method further comprises: sequentially generating remaining correlative redaction proposals based on the first redaction proposal from the transaction dependency graph.

In an embodiment, the method further comprises: if one of the validated redaction proposals is rejected, calling the correlative blockchains to reject all of the validated redaction proposals.

In a second aspect, a system for atomic, consistent and accountable cross-chain rewriting is provided. The system comprises a blockchain network comprising a set of correlative blockchains; and an intermediary blockchain capable of calling the correlative blockchains. The intermediary blockchain comprises: a proposer node comprising a processor configured for, in response to a user redaction proposal for any of the correlative blockchains, generating a set of correlative redaction proposals that involve all related transactions depending on a target transaction to be redacted by the user redaction proposal, based on a transaction dependency graph representing a dependency relationship of transactions, wherein at least one of the transactions in the transactions is to be redacted by the user redaction proposal; and a validator node comprising a processor configured for validating each of the user redaction proposal and the correlative redaction proposals, according to a predefined cross-chain redaction policy, to allow calling the correlative blockchains for executing the validated redaction proposals; wherein the transaction dependency graph is updated in response to execution of the validated redaction proposals.

In an embodiment, the intermediary blockchain further comprises a monitor node comprising a processor configured for monitoring candidate redaction proposal pools for the correlative blockchains, to detect the user redaction proposal.

In an embodiment, the system further comprises a controller configured for: in response to a cross-chain communication enabled smart contract, determining transactions involved by the cross-chain communication enabled smart contract; executing the cross-chain communication enabled smart contract by executing the transactions involved by the cross-chain communication enabled smart contract in a set of blockchains; and determining the set of blockchains as the set of correlative blockchains, wherein the user redaction proposal is aimed for redacting one of the transactions involved by the cross-chain communication enabled smart contract.

In an embodiment, the controller is configured for generating a global state mapping of the set of correlative blockchains, based on a set of original states associated with the set of correlative blockchains before executing the cross-chain communication enabled smart contract and a set of transformed states associated with the set of correlative blockchains after executing the cross-chain communication enabled smart contract.

In an embodiment, each of the correlative blockchians is configured for: for one of the validated redaction proposals, rejecting the redaction proposal if the redaction proposal triggers changing in the global state mapping of the set of correlative blockchains.

In an embodiment, the proposer node is further configured for: determining the target transaction for which the user redaction proposal is directed to; determining a first sub-transaction of the target transaction from the transaction dependency graph and determining a first blockchain associated with the first sub-transaction, wherein execution of the first sub-transaction depends on execution of the target transaction; deducing a first redaction transaction corresponding to the first sub-transaction; and generating a first redaction proposal based on the first redaction transaction and the first blockchain.

In an embodiment, the proposer node is further configured for: sequentially generating remaining correlative redaction proposals based on the first redaction proposal from the transaction dependency graph.

In an embodiment, the correlative blockchains are configured to reject all of the validated redaction proposals if one of the validated redaction proposals is rejected.

BRIEF DESCRIPTION OF THE DRAWINGS

The accompanying drawings, which are incorporated in and constitute a part of this specification, illustrate embodiments consistent with the present disclosure and together with the description serve to explain the principles of the present disclosure.

In order to more clearly illustrate technical solutions in embodiments of the present disclosure or in the conventional technology, the accompanying drawings to be used in the description of the embodiments or the conventional technology will be briefly introduced below. Obviously, other drawings may be obtained from these drawings by the skilled in the art without any creative effort.

DETAILED DESCRIPTION OF EMBODIMENTS

Figure 1:
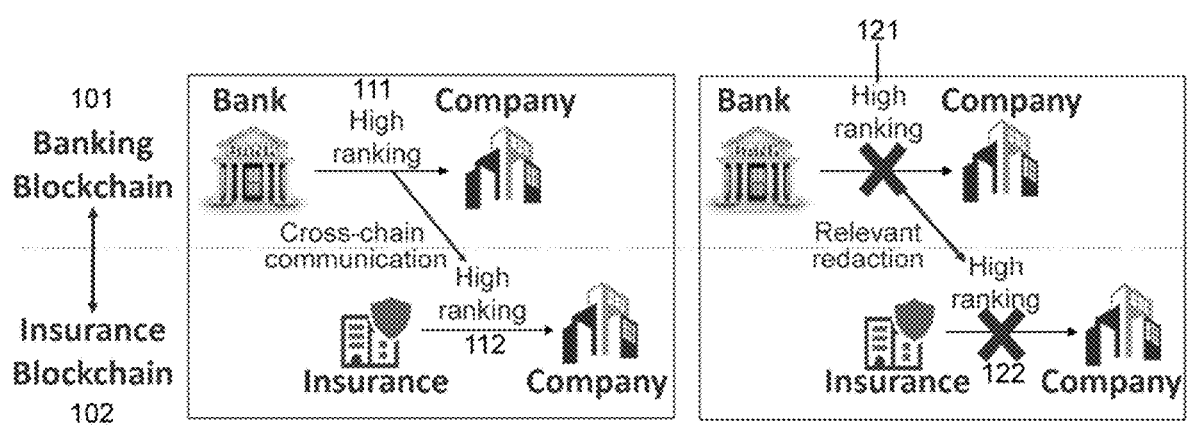
FIG. 1 is a diagram showing an exemplary scenario of redaction across different blockchains.

The exemplary embodiments of the present disclosure are described below in detail with reference to the drawings. It should be understood that the exemplary embodiments described below are used only to illustrate and interpret the present disclosure and are not intended to limit the present disclosure.

It should be noted that the exemplary embodiments of the present disclosure and features in the exemplary embodiments may be combined with each other in the case of no conflict, and all the combinations fall within the protection scope of the present disclosure. In addition, although a logical order is shown in the flowchart, the steps shown or described may be performed in a different order from the order here in some cases.

In implementations, a computing device that performs a data processing method may include one or more processors (CPU, Central Processing Module), an input/output interface, a network interface and a memory.

The memory may include a volatile memory, a random access memory (RAM) and/or a non-volatile memory and other forms in a computer readable medium, for example, a read-only memory (ROM) or a flash RAM. The memory is an example of the computer readable medium. The memory may include a module 1, a module 2, . . . , and a module N (N is an integer greater than 2).

The computer readable medium includes non-volatile and volatile media as well as removable and non-removable storage media. A storage medium may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic disk storage or other magnetic storage devices, or any other non-transmission media, and may be used to store information accessible to the computing device.

In particular, one big issue needing to be considered for blockchain rewriting across multiple homogeneous or heterogeneous blockchains (hereafter called as cross-chain rewriting for short) is discovering and redacting the correlative transactions, when a cross-chain transaction is redacted. To be specific, the on-chain states of distinct blockchains are inter-dependent, since the blockchains interact with each other. Therefore, it might have relevant (direct or indirect) effects on the states of other blockchains, as certain block or transaction content is rewritten in a blockchain. The relevant on-chain states are required to be redacted correspondingly. Otherwise, the states of certain decentralized applications across blockchains will become inconsistent, posing a challenge to maintain redaction consistency.

Referring to FIG. 1, an application scenario of redaction across multiple blockchains is illustrated. This scenario is built upon two distinct blockchains 101 and 102, as illustrated in FIG. 1. One of these blockchains is dedicated to banking operations, while the other serves as an insurance blockchain 102. Suppose that a bank teller mistakenly issues a high credit application (indicated by numeral of 111) to a blacklist person in the bank blockchain, while he does not detect and amend this issue in time. After that, this person requests (indicated by numeral of 112) services from the insurance blockchain 102. The above mistakes make two blockchains 101 and 102 store error data permanently, if blockchain rewriting is not available. The increasing error (indicated by numerals of 121 and 122) records not only expand the size of the blockchain, but also affect the possible personal credit evaluation both in the banking and insurance blockchains 101 and 102, e.g., one's credit rating, which relies on the on-chain historical transactions. As a result, the bank and the insurance company may suffer from economic losses. Therefore, it is needed an appropriate cross-blockchain redaction approach to removing the error records by rewriting the transactions on the bank blockchain, and subsequently the insurance blockchain also rewrites the correlative transactions.

Another aspect that requires attention is the atomicity when dealing with cross-chain rewriting. This means that all rewriting transactions of a cross-chain rewriting proposal either are all completed, or none of transactions is processed. If a transaction within a specific blockchain undergoes complete redaction, resulting in a state transition, it follows that a series of inter-chain transactions depending on the previous state must be subsequently rewritten. On the other hand, if rewriting the set of inter-chain transactions is not feasible, the states corresponding to the redacted transaction must be rolled back. It is needed to investigate in depth the relevant effect of rewriting across other blockchain transactions. In fact, it is challenging to realize atomic blockchain rewriting.

Besides, it is to address the following issues by some preferable embodiments of the present disclosure. It is preferable not to require modification of the underlying individual blockchains or change the structure of a transaction or a block. On the other hand, it is preferable to consider the accountable effects of rewriting on the relevant transactions or blocks.

According to an embodiment, a permissioned blockchain scenario is considered, where immutable human errors and vulnerable smart contracts deployment, e.g., in internet of thing, should be rewritten in a controllable and accountable way. Specifically, in an optional embodiment, the rewriting challenge that a transaction being rewritten will have an atomic and consistent consequence on the states of other transactions. In particular, as the proliferation of decentralized applications, an increasing number of blockchains are intimately bound up with each other. Therefore, a way for securing cross-chain applications is paved, while satisfying the rewriting requirement.

There may be two challenges when it comes to implementing cross-chain redaction: Challenge (a): Correct cross-chain redaction. In a cross-chain scenario, a redaction transaction on one blockchain triggers the subsequent redaction operations on other correlative blockchains. But each underlying blockchain usually operates independently and autonomously. There is no trusted central entity responsible for coordinating and managing the sequential execution of redaction operations across the interconnected blockchains. Challenge (b): Accountable cross-chain redaction. A transaction rewriting which would bring cascading rewriting operations should be accountable. However, there is no mechanism that enables other blockchain nodes to rewrite correspondingly and convince them to generate correct redaction proposal, instead of arbitrary rewriting proposals. In addition, solutions that address accountable redaction for a single blockchain may not effectively achieve accountable cross-chain redaction. This limitation arises from the absence of a comprehensive understanding of the inter-chain redaction transaction dependencies and the heterogeneous transaction verification mechanisms of different blockchains.

According to embodiments of the present disclosure, it is provided an atomic, consistent and accountable blockchain rewriting scheme. The method according to embodiments of the present disclosure not only is adopted to enable rewriting across blockchains with accountability and atomicity guarantees, but also is orthogonal to existing blockchain rewriting approaches.

The main challenges of cross-chain redaction include achieving rewriting consistency, ensuring atomic swapping, and enabling accountable cross-chain redaction.

The method according to embodiments of the present disclosure addresses these challenges by introducing a decentralized intermediary for generating and maintaining global cross-chain redaction states and transaction dependencies. It also proposes a novel cross-chain state mapping with rollback rules, as well as customized block structures and verification algorithms, to ensure rewriting consistency and atomicity. Additionally, the method according to embodiments of the present disclosure achieves accountable cross-chain redaction by enabling rewriting across blockchains with accountability and atomicity guarantees, and by providing automatic redaction proposal verification without human involvement.

Some technical terms and concepts are explained herein after to facilitate understanding the solutions as proposed in the present disclosure.

A blockchain is a transparent, immutable distributed ledger that is maintained by a group of peer nodes. The nodes are responsible to verify the correctness of transactions based on certain consensus mechanism. In the distributed ledger, transactions can be recorded and managed without relying on a centralized trusted party. Moreover, none of party is able to modify a transaction once the transaction has been written into blockchain. More precisely, a blockchain is denoted as a number of connected blocks, where each block BK is composed of two parts: a block header $Head(BK_i)$ and a body $\emptyset_i$, i.e., $BK_i$ :=(Head(BKd$i$), $\emptyset_i$). $Head(BK_i)$=(ph,$H_0(st_i)$, $H_0(tx_i),\overline{\omega}$) consists of a hash of a previous block header ph=$H_1(Head(BK_{i-1}))$, a Merkle root $H_0(st_i)$ of the state tree and a Merkle root $H_0(tx_i)$ of the transaction tree, and some other metadata $\overline{\omega}$, e.g., the difficulty level and a nonce, where $H_0$ refers to a hash function. The body $\emptyset_i$=<TX$_i$> refers to a set of transactions included in the block i. The basic functionalities of a blockchain $\Gamma$ can be modelled as follows:

$\Gamma$.valiateTx(tx): returns 1 if a transaction tx satisfies the transaction validation rules, including the structure, timestamp, and signature, etc.

$\Gamma$.valiateBlock(BK): returns 1 if a block BK is a valid block structure. In particular, it checks that the hash value of ph and the previous block header $Head(BK_{i-1})$ are equal to the $H_0(\emptyset)$ and $H_1(Head(BK_{i-1}))$, respectively.

$\Gamma$.valiateChain(·): returns 1 if all blocks are valid according to a basic consensus protocol.

$\Gamma$.broadcast(data): broadcasts data to the distributed network.

Many blockchain mechanisms, proof-of-work (PoW), proof-of-stake (POS), proof-of-authority (PoA) or Byzantine Fault Tolerant (BFT), are proposed that are at the heart of a decentralized ecosystem and can help reach consensus among blockchain nodes. The PoW consensus algorithm used by Bitcoin is considered a reliable and secure consensus mechanism, but does not support scalability. Consequently, it imposes performance limitations on the Bitcoin network and transaction speeds. The primary drawback is its high energy consumption due to the resource-intensive mathematical problems it necessitates. PoS was introduced as a consensus algorithm that promises improved performance compared to PoW. The PoA is a consensus algorithm commonly employed in private blockchains and enterprise-level blockchain networks, representing an enhanced version of PoS. In contrast to other consensus algorithms, PoA prioritizes the identity and trustworthiness of validators over computational resources or cryptocurrency ownership. It is predominantly applied within enterprise or private blockchain networks consisting of specific entities or organizational partners. In PoA, validators are duly authenticated and trusted entities.

Another technical term is smart contract, which enables programming Turing-complete computation. A smart contract can define a sequence of entry points, and then the entry points are triggered and executed automatically in the blockchain upon receiving valid inputs.

Cross-chain Communication (CCC) plays a crucial role in state transition and concurrency exchange among multiple different blockchains. A correct CCC protocol needs to satisfy three properties, i.e., effectiveness, atomicity and timeliness. The first two properties ensure the correctness of the CCC protocol, enforcing that all involving transactions either all succeed, or none of transactions succeeds. The last property specifies the security of CCC from the perspective of persistence and liveness. CCC-enabled Smart Contract (abbr. as CSC hereafter) allows one to create a decentralized application (abbr. as dApp) that is executed across heterogeneous blockchains.

The CCC protocol usually involves a cross-chain platform P, a set of blockchain systems $\{B_1, \ldots, B_n)\}$, and a set of users $\{U_1, U_2, \ldots \}$. Then, the CSC defined with a set of events can be appointed to coordinate the interactions between the users and the blockchain systems, starting from an initial state. As an event is triggered by a transaction, the state is transited into the next state. The transaction is denoted as a five-element tuple (B,inps,oupt,data,time) on a certain blockchain B. Herein, inps and oupt refer to the inputs (e.g., unspent coins) and outputs (e.g., coins transferred to a receiver), respectively. The data field data specifies the data loaded into CSC. Last, time is a timestamp of the transaction.

According to an embodiment of the present disclosure, a transaction dependency graph (TDG) in Definition 1, which is used to represent the dependency relationship of the transactions involved in a CSC.

Definition 1. (Transaction Dependency Graph). A TDG $G_T=\{V,E\}$ refers to a directed acyclic graph that specifies the dependency and execution order of CSC transactions. Let $V:=\{TX_i \cup TX_j, i,j \in [1,n]\}$, where $TX_i$ and $TX_j$ are the set of transactions on blockchain $B_i$ and $B_j$ respectively. and $E=\{(tx_i^x, tx_j^y, D(tx_i^x \Rightarrow tx_j^y) | tx_i^x \in TX_i, tx_j^y \in TX_j, i,j \in [1,n]\}$.

$D(tx_i^x \Rightarrow tx_j^y)$ denotes that the transaction $tx_j^y$ depends on the execution of transaction $tx_i^x$. $tx_j^y$ can be executed on if and only if has been confirmed on B;

Take the interaction between $TX_2$ on chain $B_2$ and $TX_3$ on chain $B_3$ as an illustration. Assume that $TX_2=(tx_2^1, tx_2^2)$ are transactions posted by Alice who applies for two subsequent services on $B_2$, e.g., creating an account and applying for a loan. If Alice succeeds in application on $B_2$, then $B_3$ also allows Alice to post $TX_3=(tx_3^1, tx_3^2)$, so as to enjoy other services, e.g., car loan.

Specially, the basic procedures can be explained as follows:

Alice posts an initial transaction $tx_2^1$ on chain $B_2$ to apply for an account. If the application is agreed by the maintainers of $B_2$, it represents a successful state transition of Alice from empty account to, e.g., gold account. At this point, there is an evidence evi={$tx_2^1$,bks,bkh,mkPath} generated on chain $B_2$, where bks refers to a set of recent k blocks, bkh refers to the block height, mkPath is the Merkle root path to check the validation of $tx_2^1$. The evidence evi can be used to show that Alice has succeeded in account application on $B_2$.

The platform P checks the validation of proof evi. If the verification is successful, the majority of platform maintainers sign on the evi and post evi to chain $B_3$ Meanwhile, Alice can send transactions $TX_3$ to trigger subsequent state transitions on chain $B_3$.

A set of deciders (identified by D) in a blockchain make the decisions based on consensus voting, according to an appointed redaction policy. Besides, the deciders are required to provide a proof for attesting the redaction correctness.

A procedure to conduct the transaction redaction is outlined below.

Step 1: Initialization. A redaction candidate pool Pool is initialized to store the redaction proposals.

Step 2: Redaction Proposing. A user can propose a redaction proposal rp:={BK*, tx, tx*, editTx}, where BK* refers to the block that contains the transaction tx to be redacted, tx* is a candidate transaction to replace tx, editTx is a special transaction that contains the digest of tx and tx*, i.e., editTx=$H_0$(tx||tx*). The proposal rp will be sent to the redaction candidate pool Pool and broadcast to the redaction deciders.

Step 3: Proposal Validation. A decider D checks the validation of the proposal rp. If it is valid, the decider signs on it and sends his approval to the miners.

Step 4: Proposal Approval. If the proposal rp is approved by the majority of the deciders under the guideline of a redaction policy P, the miner can accept the redaction proposal by putting editTx to a coinbase (transaction) of the new block he generates.

Step 5: Redaction Validation. Once editTx has been confirmed for several k blocks, where k is a security parameter of blockchain [30], it denotes that the redaction proposal rp has been finally accepted by the blockchain maintainers. At this point, a redacted blockchain B* is generated. The maintainers or a new coming maintainer can check B* with pre-defined policy P, and accept the redacted blockchain if it is valid.

In the following, the problem of the cross-chain rewriting is formalized. The utilized notations are illustrated in Table 1. These definitions include concepts like correlative blockchains, finite state machine, global state machine, and global state machine mapping.

TABLE 1

| Notation | Explanation |
| --- | --- |
| λ | The security parameter. |
| k | The number of blocks for persistence on a blockchain. |
| [n] | The set of natural numbers (1, . . . , n). |
| $B_i$ | A blockchain, where i ∈[n] |
| $TX_i$ | A set of transactions on $B_i$. |
| $tx_i^1$ | A transaction in the set $TX_i$. |
| rp | A redaction proposal. |
| P($B_i$, rp) | A redaction policy P for rp on blockchain $B_i$ |
| SP | A state space. |
| $H_0$(•) | A cryptographic hash function, $H_0$ : {0, 1}* → {0, 1}$^l$ |

TABLE 1-continued

| Notation | Explanation |
| --- | --- |
| $s_i$ | A state of a SP |
| ST = {tx:$s_i$ → $s_{i+1}$} | A state transition triggered by a transaction tx |
| Σ · (KGen, Sign, Verify) | The key generation, signing, and verification algorithm in digital signature. |
| rpGen | A function of generating redaction proposals. |

Definition 2. (Correlative Blockchains). A set of blockchains {$B_1$, . . . , $B_n$)} are regarded as correlative blockchains, if there exist cross-chain communications among these blockchains, including asset transfer and data exchange.

Definition 3. (Finite State Machine). A finite state machine M is a five-element tuple {S,$s_0$,$f$,IN,OUT}. Herein, S refers to a finite set of states. $s_0$∈S is the initial state. $f$ refers to the state transition function. IN and OUT refer to finite input alphabet and finite output alphabet, respectively.

Definition 4. (Global State Machine) A global state machine associated with m interoperable blockchains, is defined as GM={$M_i$}$_{i∈[m]}$ in which $M_i$ refers to a finite state machine associated with a blockchain.

Definition 5. (Global State Machine Mapping). Global state machine (GSM) mapping defines a mapping relationship of the states between any two finite state machines: Δ:{$f_i$(IN)↔$f_j$(IN), $f_i$(IN)∈$M_i$, $f_j$(IN)∈$M_j$, j∈[m]\i}, where Δ refers to the state mapping function that one state transition on $M_i$ is related to other state transitions on $M_j$ where j∈[m]\i. Note that both state machines $M_i$ and $M_j$ are the components of the GSM GM.

In a cross-chain scenario, the GSM mapping is governed by two specific requirements. First, it stipulates when a state transition occurs on one blockchain, it must trigger a corresponding state transition on another blockchain, provided that both blockchains are correlative in nature. This ensures that the changes in one blockchain's state have a synchronized impact on the state of another blockchain, promoting state consistency across multiple blockchains. Second, it requires that when the state of one state machine of a blockchain is updated from its current state s to a new state s', the state of another state machine can only transit from its current state to a predetermined specific state, rather than any state. This restriction ensures that state changes within a blockchain are controlled under a predetermined mapping relationship, preventing arbitrary or unintended state transitions. By defining specific target states, the blockchain network maintains a predictable environment where state machines run in a correct manner.

Consider a scenario where two dApps are deployed on two correlative blockchains, denoted as $B_1$ and $B_2$ respectively. These dApps are associated with two finite state machines, namely $M_1$ and $M_2$, reflecting the state transitions of the respective applications. It is assumed that there are two specific transactions, $tx_1^1$ and $tx_2^1$, which correspondingly trigger state transitions on $M_1$ and $M_2$. For instance, the state transition function $f_1$: $s_0$×$tx_1^1$→$s_1$ represents the effect of $tx_1^1$ on $M_1$, where $s_0$ represents the initial state and $s_1$ denotes the resulting state. Note that these two state machines have a dependency relationship. Consequently, if $tx_1^1$ has not been confirmed and accepted on blockchain $B_1$, $tx_2^1$ would not be approved by blockchain $B_2$. As a result, the corresponding state transition triggered by $tx_2^1$ in $M_2$ would not take place.

The cross-chain redaction scenario specifically focuses on a set of correlative blockchains $\{B_1, \ldots, B_n\}$, in which each blockchain deploys a dApp associated with a finite state machine $M_i$ ($i \in [n]$). In order to process redaction transactions, a CSC is created that interacts with these state machines. The CSC coordinates the processing of a sequence of redaction proposals. Specifically, if a redaction proposal $rp_i$ has been proposed and accepted in blockchain $B_i$, then the correlative blockchains are required to generate the corresponding redaction proposals and rewrite the transactions that are affected by the transaction of $rp_i$. It is defined three phases Internal-chain Verification and Notification, Cross-chain Verification and Redaction Generation for the CSC execution.

Phase 1: Internal-chain Verification and Notification, represented as 1/0←validateCand($rp_i$, $B_i$).

Internal blockchain nodes validate the initial redaction proposal $rp_i$, and go to the next step if it is valid.

broadcast($rp_i$,π): The blockchain nodes broadcast the redaction proposal to their own network, and a proof π representing that $rp_i$ has been accepted in blockchain $B_i$;

Phase 2: Cross-chain Verification, represented as 1/0↓validate($rp_i$, π, $B_i$): Correlative blockchains check the validation of $rp_i$ with the proof π. If the proposal $rp_i$ is valid, they go to the next phase.

Phase 3: Correlative Redaction Generation $\{(B_j,\{rp_T\}_{T \geq 1})\}_{j \in [n]} \leftarrow rpGen(rp_i, G_T, \Delta)$: A decentralized intermediary role generates a set of redaction proposals including all transactions affected by $rp_i$.

Figure 2:
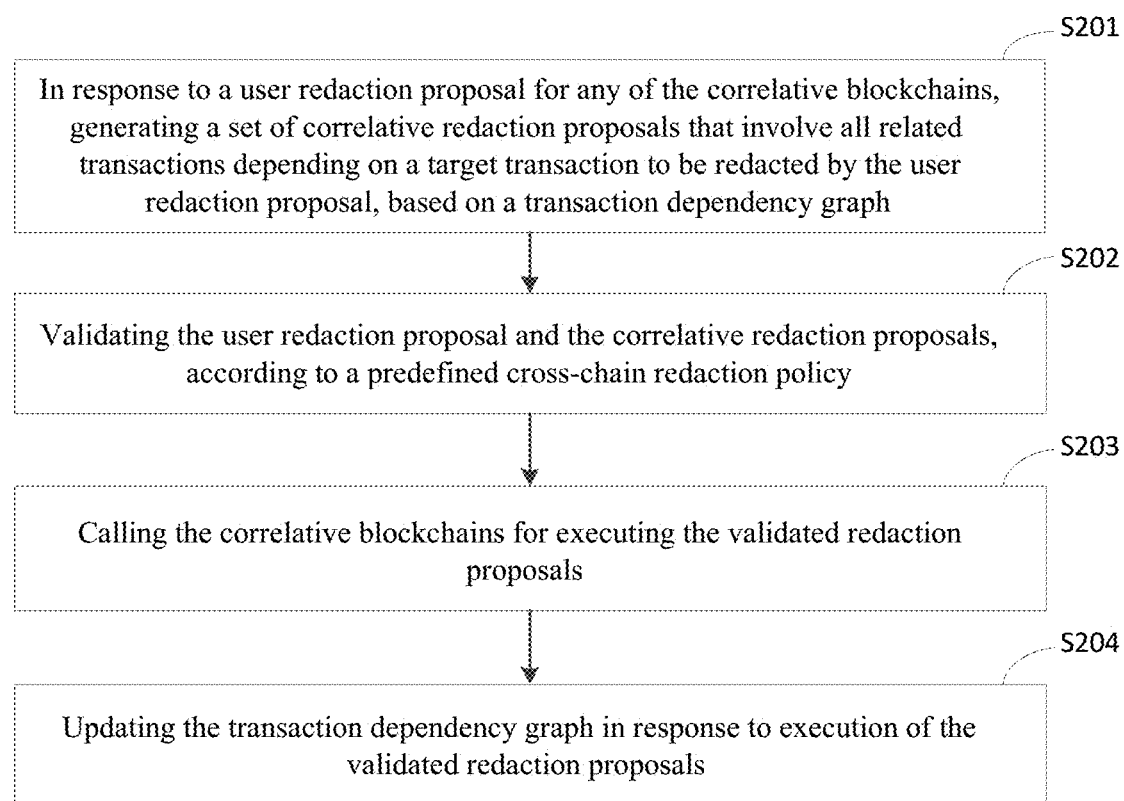
FIG. 2 is a flow chart of a method for atomic, consistent and accountable cross-chain rewriting according to an embodiment of the present disclosure.

Referring to FIG. 2, a flowchart for a method for atomic, consistent and accountable cross-chain rewriting according to an embodiment of the present disclosure is illustrated. The method 200 is applicable for a blockchain network including a set of correlative blockchains. The method 200 may include steps S201 to S203.

According to embodiments of the present disclosure, an intermediary blockchain can be constructed for performing the method for atomic, consistent and accountable cross-chain rewriting. In an implementation, the intermediary blockchain includes nodes such as monitor nodes, proposer nodes, validator nodes, and the like.

In step S201, in response to a user redaction proposal for any of the correlative blockchains, a set of correlative redaction proposals is generated based on a transaction dependency graph. The generated correlative redaction proposals involve all related transactions depending on a target transaction which is to be redacted by the user redaction proposal. The transaction dependency graph is configured to represent a dependency relationship of transactions, and the user redaction proposal aims to perform redaction on at least one of the transactions in the transaction dependency graph.

In some implementation of the present disclosure, monitor nodes may monitor candidate redaction proposals for the correlative blockchains. For example, the monitor nodes may periodically monitor candidate redaction proposals for the correlative blockchains to detect the user redaction proposal that might incur cross-chain redaction.

By checking the transaction dependency graph, those transactions having dependency on the to-be-redacted transaction can be determined. In some preferable embodiments, the order of the transactions having dependency on the to-be-redacted transaction can be further determined from the transaction dependency graph. To keep the rewriting consistency, the execution of the user redaction proposal should incur additional redactions on the transactions having dependency on the to-be-redacted transaction. For this purpose, a set of correlative redaction proposals is generated with regard to the transactions having dependency on the to-be-redacted transaction.

It is noted that the transaction dependency graph (TDG) is preconfigured. For example, in an exemplary implementation, in response to a cross-chain communication enabled smart contract (CSC), CSC transactions involved by the cross-chain communication enabled smart contract are determined. By those procedures of proposal, validating, voting, accepting/rejecting, and executing of transactions in the blockchains as described above, these determined CSC transactions can be executed on a set of blockchains; and in turn the CSC is executed. In this case, the set of blockchains for executing the CSC transactions may be regarded as correlative blockchains. Accordingly, the transaction dependency graph may be generated for the CSC transactions. In an exemplary implementation, the TDG specifies dependency and execution order of the CSC transactions. Therefore, according to an exemplary implementation of the present disclosure, once one of the CSC transcations is redacted, other CSC transactions dependent on the to-be-redacted transaction can be determined from the TDG, and the order for redacting these related CSC transactions can also be determined from the TDG. On this basis, the correlative redaction proposals can be generated.

According to another embodiment, a global state mapping of the set of correlative blockchains may be generated, based on a set of original states associated with the set of correlative blockchains before executing the cross-chain communication enabled smart contract and a set of transformed states associated with the set of correlative blockchains after executing the cross-chain communication enabled smart contract. In this embodiment, the global state mapping of the set of correlative blockchains may further guide the generation of all correlative redaction proposals on the correlative blockchains.

In some exemplary implementations, the correlative redaction proposal is generated in the following process. First of all, a target transaction for which the user redaction proposal is directed to is determined. In other words, the to-be-redacted transaction is firstly determined for the user redaction proposal. Subsequently, a first sub-transaction of the target transaction is determined from the transaction dependency graph and a first blockchain associated with the first sub-transaction is determined from the transaction dependency graph. Since the transaction dependency graph specifies the dependency of the related transactions, the first sub-transaction, which is indicated as directly depending on the execution of the target transaction in the transaction dependency graph, can be determined, and the first blockchain associated with the first sub-transaction can also be determined. Then a first redaction transaction for redacting the first sub-transaction can be deduced. With the deduced first redaction transaction together with the determined first sub-transaction, a first redaction proposal is generated, for example, by a proposer node in the intermediary blockchain as described above. In the similar manner, a second sub-transaction of the first sub-transaction, which is indicated as directly depending on the execution of the first sub-transaction in the transaction dependency graph, can be determined, and the second blockchain associated with the second sub-transaction can also be determined. Thus, a second redaction transaction for redacting the second sub-transaction can be deduced. With the deduced second redaction transaction together with the determined second sub-transaction, a second redaction proposal is generated. This procedure repeats to generate the set of correlative redaction proposals that involve all related transactions depending on the transaction to be redacted by the detected user redaction proposal.

In step 202, each of the user redaction proposal and the correlative redaction proposals may be validated, according to a predefined cross-chain redaction policy.

In an exemplary implementation, the defined cross-chain redaction policy includes four requirements: (a) the proposed proposal preserves the address or the value fields of a transaction; (b) the proposal is accepted by a majority of nodes; (c) The proposal does not redact the votes of other proposals; (d) the proposal includes all transactions related to on the initial redaction transaction.

In step 203, the correlative blockchains are correspondingly called for executing the validated redaction proposals. The validated redaction proposals includes not only the user redaction proposal but also the correlative redaction proposals.

The procedures of validation of the redaction proposal, the voting for the transaction associated with the redaction proposal, the accepting/rejecting for the transaction, and the executing of the transaction by the blockchain are similar to those described above and the description is omitted here.

It is noted that the correlative redaction proposals may be generated and executed sequentially, in a cascaded manner, in a pipeline manner, or in any possible manner, and this disclosure is not limited in this aspect.

It is noted that any of the redaction proposals including the user redaction proposal and the correlative redaction proposals may fail in validation, and in this case the method for atomic, consistent and accountable cross-chain rewriting may end.

Alternatively, the method for atomic, consistent and accountable cross-chain rewriting may be performed from the start to generate a new set of redaction proposals. The present disclosure is not limited in this aspect.

It is noted that, in an exemplary implementation where the global state mapping is generated, if one of the redaction proposals triggers changing in the global state mapping of the set of correlative blockchains, the redaction proposal is to be rejected. In this case, the consistency of the global state mapping is maintained and eventual consistency of the cross-chain rewriting can be maintained.

It is noted that, in an exemplary implementation, if one of the redaction proposals is rejected, the correlative blockchains are called to reject all of the redaction proposals. In step S204, the transaction dependency graph is updated in response to execution of the validated redaction proposals.

Hereafter, a practical procedure for implementing cross-chain rewriting by using the method for atomic, consistent and accountable cross-chain rewriting according to the embodiments of the present disclosure is described below:

1. User Proposes Redaction: A user proposes a redaction operation on a specific blockchain, triggering the initiation of a redaction proposal.
2. Monitoring and Broadcasting: The cross-chain network's monitor observes the redaction operation and broadcasts it to the network, ensuring visibility and tracking of the proposed rewriting.
3. Proposal Generation: Based on the observed redaction operation, the proposer from the cross-chain network generates a redaction proposal for the affected blockchain, considering the dependencies and related transactions.
4. Validation and Verification: The nodes of the intermediary blockchain act as validators, verifying the validity of the generated redaction proposal. The proposal is then sent to the affected blockchain for further validation, ensuring consensus-based decision-making and accountability.
5. State Update: Upon acceptance of the redaction proposal by the affected blockchain, the state of the involved transactions is updated, ensuring the consistency and correctness of the cross-chain redaction.

This flow ensures that redaction operations are coordinated across multiple blockchains, maintaining atomicity and consistency while addressing the complexities of inter-chain transaction dependencies.

Figure 3:
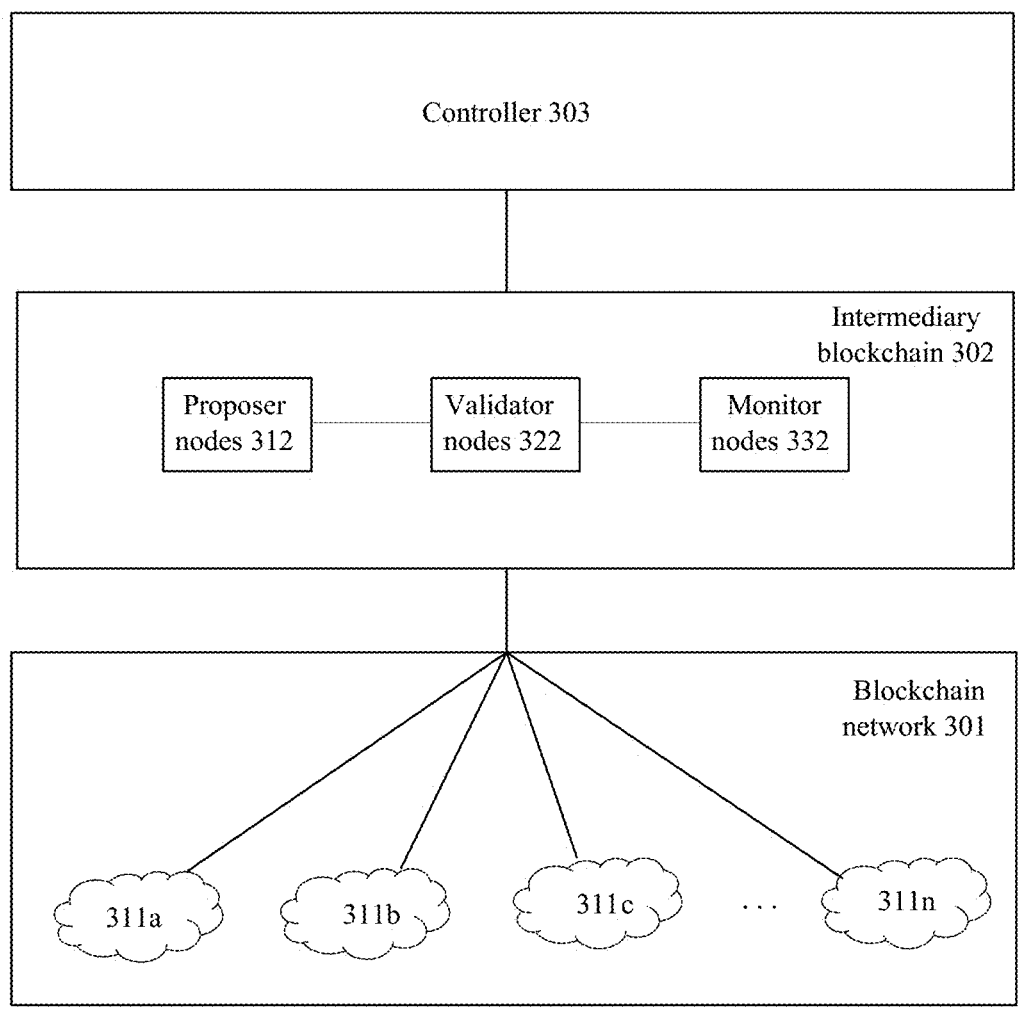
FIG. 3 is a diagram showing a system for atomic, consistent and accountable cross-chain rewriting according to an embodiment of the present disclosure.

In the following, a system for atomic, consistent and accountable cross-chain rewriting according to an embodiment of the present disclosure is described by referring to FIG. 3. The system 300 includes a blockchain network 301 and an intermediary blockchain 302. The blockchain network 301 includes a set of correlative blockchains 311a to 311n. The intermediary blockchain 302 is capable of calling the correlative blockchains 311a to 311n.

In an exemplary implementation, the intermediary blockchain 302 includes multiple nodes playing different roles of blockchain. In particular, the intermediary blockchain 302 includes proposer nodes 312, each of which is configured for, in response to a user redaction proposal for any of the correlative blockchains, generating a set of correlative redaction proposals that involve all related transactions depending on a target transaction to be redacted by the user redaction proposal, based on a transaction dependency graph representing a dependency relationship of transactions, at least one of which to be redacted by the user redaction proposal. The intermediary blockchain 302 further includes validator nodes 322, each of which is configured for, validating each of the user redaction proposal and the correlative redaction proposals, according to a predefined cross-chain redaction policy.

Once the user redaction proposal and the correlative redaction proposals are validated by the intermediary blockchain 302, corresponding ones of the correlative blockchains 311a to 311n are called for executing the validated redaction proposals.

In some exemplary implementations, the proposer node 312 is further configured for: determining the target transaction for which the user redaction proposal is directed to; determining a first sub-transaction of the target transaction from the transaction dependency graph and determining a first blockchain associated with the first sub-transaction, wherein execution of the first sub-transaction depends on execution of the target transaction; deducing a first redaction transaction corresponding to the first sub-transaction; and generating a first redaction proposal based on the first redaction transaction and the first blockchain. The proposer node 312 can repeat similar procedure to sequentially generating remaining correlative redaction proposals based on the first redaction proposal from the transaction dependency graph.

In some exemplary implementations, the system 300 further stores and maintains the transaction dependency graph. In response to the execution of the validated redaction proposals by the correlative blockchains 311a to 311n, the transaction dependency graph is updated accordingly.

In another exemplary implementations, the intermediary blockchain 302 further includes monitor nodes 332 each being configured for monitoring candidate redaction proposal pools for the correlative blockchains, to detect the user redaction proposal.

In some exemplary implementations, the system 300 further includes a controller 303 configured for: in response to a cross-chain communication enabled smart contract, determining transactions involved by the cross-chain communication enabled smart contract; executing the cross-chain communication enabled smart contract by executing the transactions involved by the cross-chain communication enabled smart contract in a set of blockchains; and determining the set of blockchains as the set of correlative blockchains. It is noted that the user redaction proposal is aimed for redacting one of the transactions involved by the cross-chain communication enabled smart contract.

In some exemplary implementations, the controller 303 is further configured for generating a global state mapping of the set of correlative blockchains, based on a set of original states associated with the set of correlative blockchains before executing the cross-chain communication enabled smart contract and a set of transformed states associated with the set of correlative blockchains after executing the cross-chain communication enabled smart contract.

In some exemplary implementations, each of the correlative blockchains 311a to 311n is configured for: for one of the validated redaction proposals, rejecting the redaction proposal if the redaction proposal triggers changing in the global state mapping of the set of correlative blockchains.

In some exemplary implementations, the correlative blockchains 311a to 311n are configured for: rejecting all of the validated redaction proposals if one of the validated redaction proposals is rejected.

Figure 4:
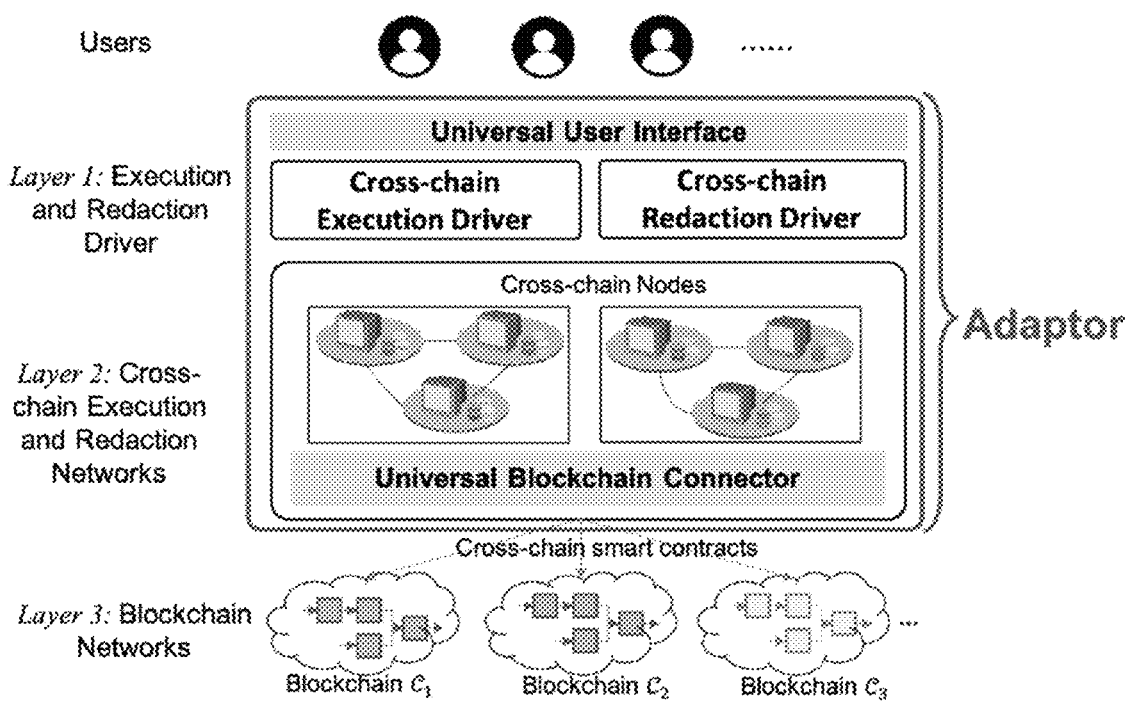
FIG. 4 is a diagram showing architecture for implementing atomic, consistent and accountable cross-chain rewriting according to an embodiment of the present disclosure.
Figure 5:
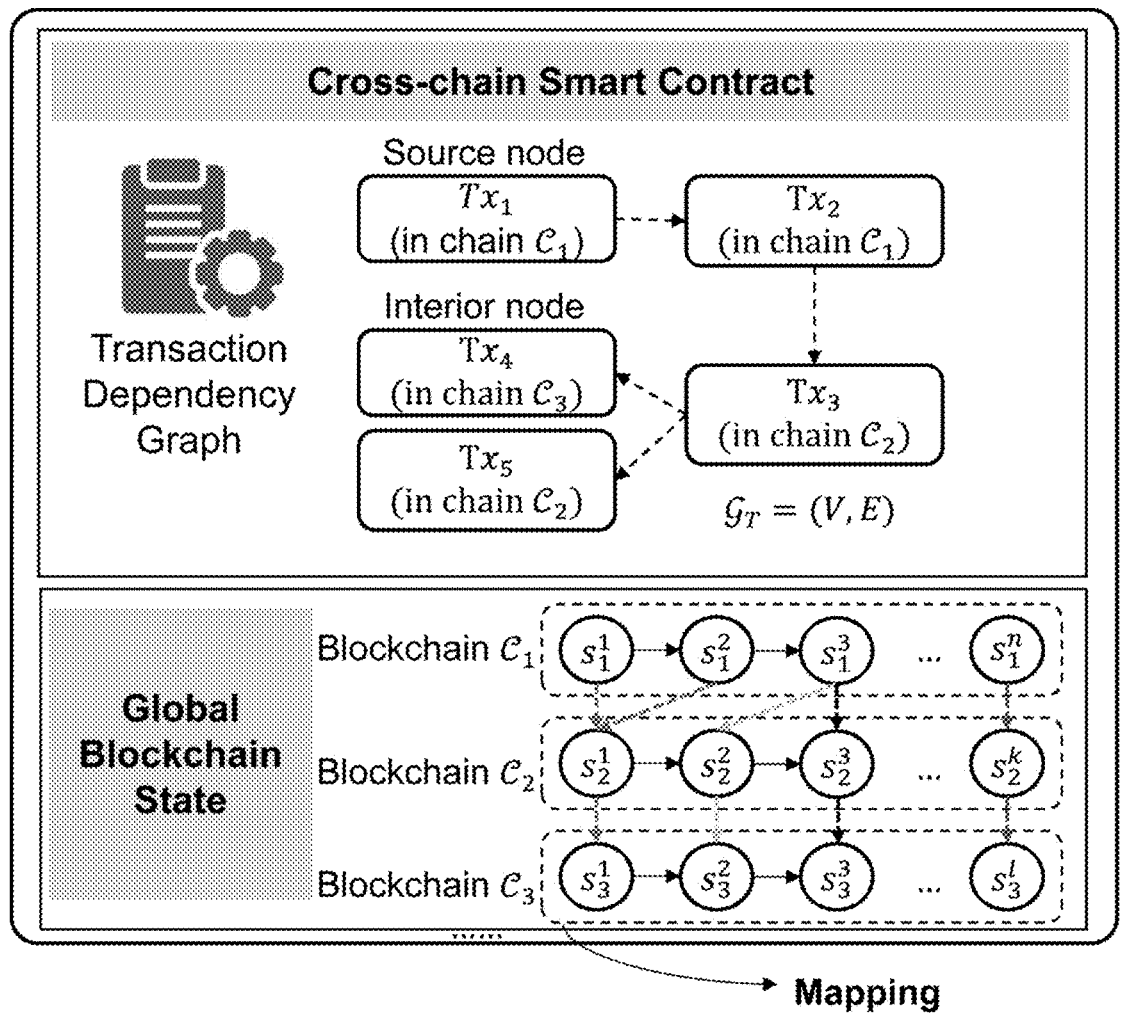
FIG. 5 is a structural diagram of a cross-chain execution driver in the architecture of FIG. 4 according to an embodiment of the present disclosure.
Figure 6:
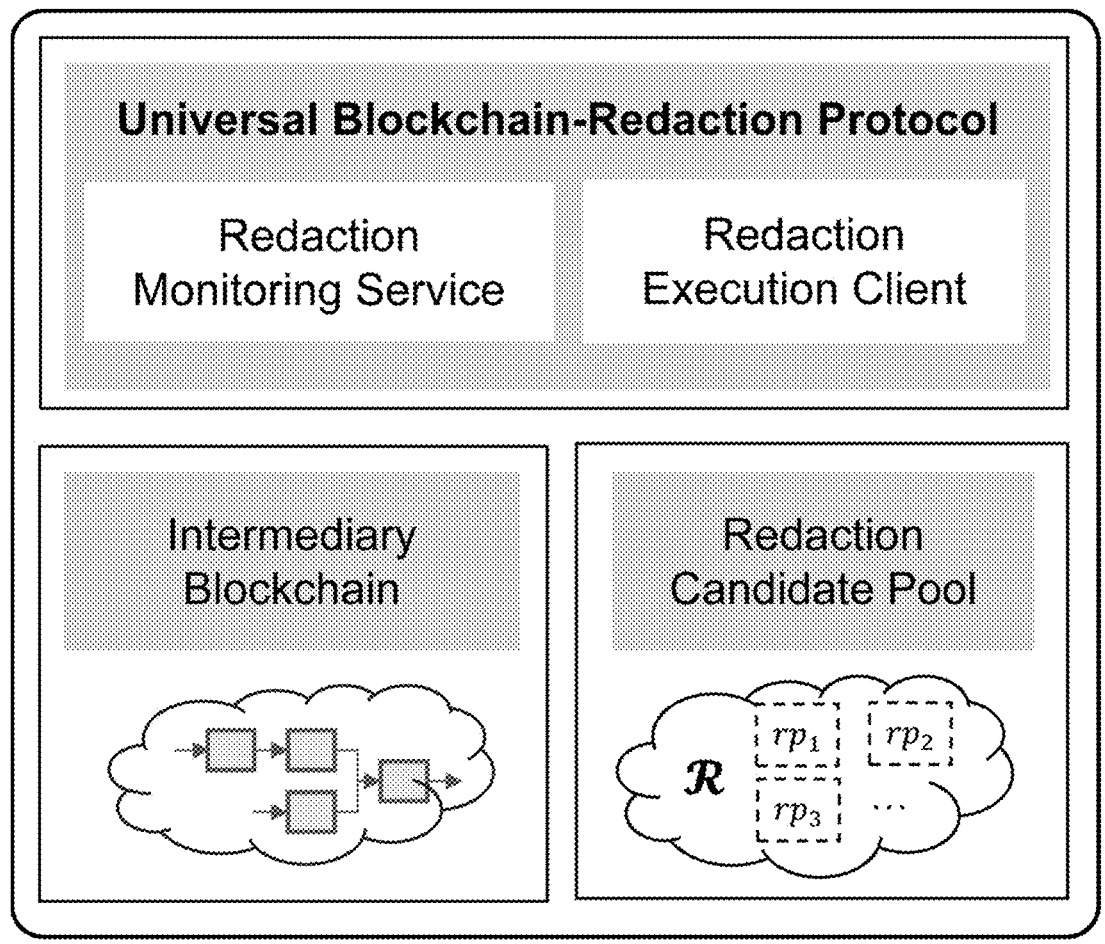
FIG. 6 is a structural diagram of a cross-chain redaction driver in the architecture of FIG. 4 according to an embodiment of the present disclosure.
Figure 7:
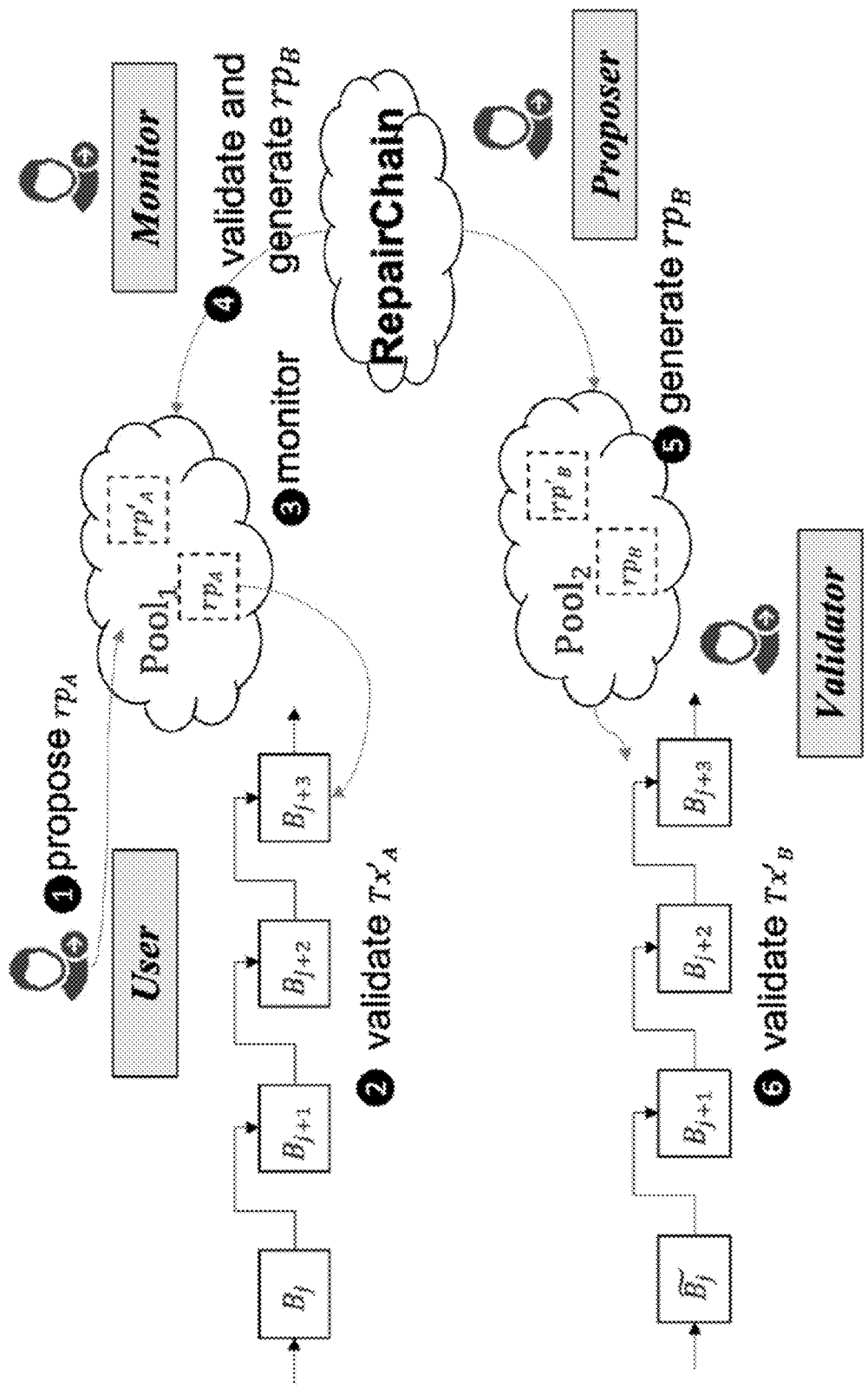
FIG. 7 shows an exemplary workflow of redaction across two different blockchains according to an embodiment of the present disclosure.
Figure 8:
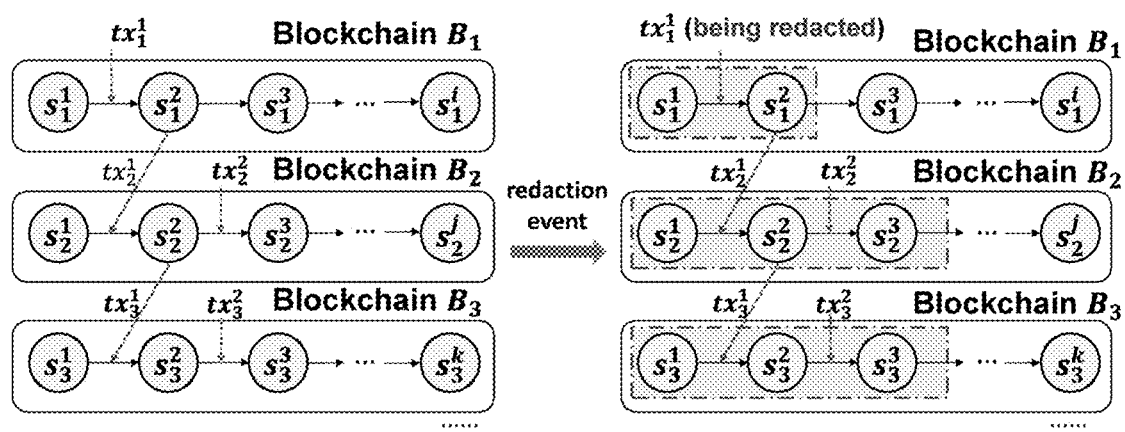
FIG. 8 shows an exemplary global state machine mapping in a cross-chain smart contract according to an embodiment of the present disclosure.
Figure 9:
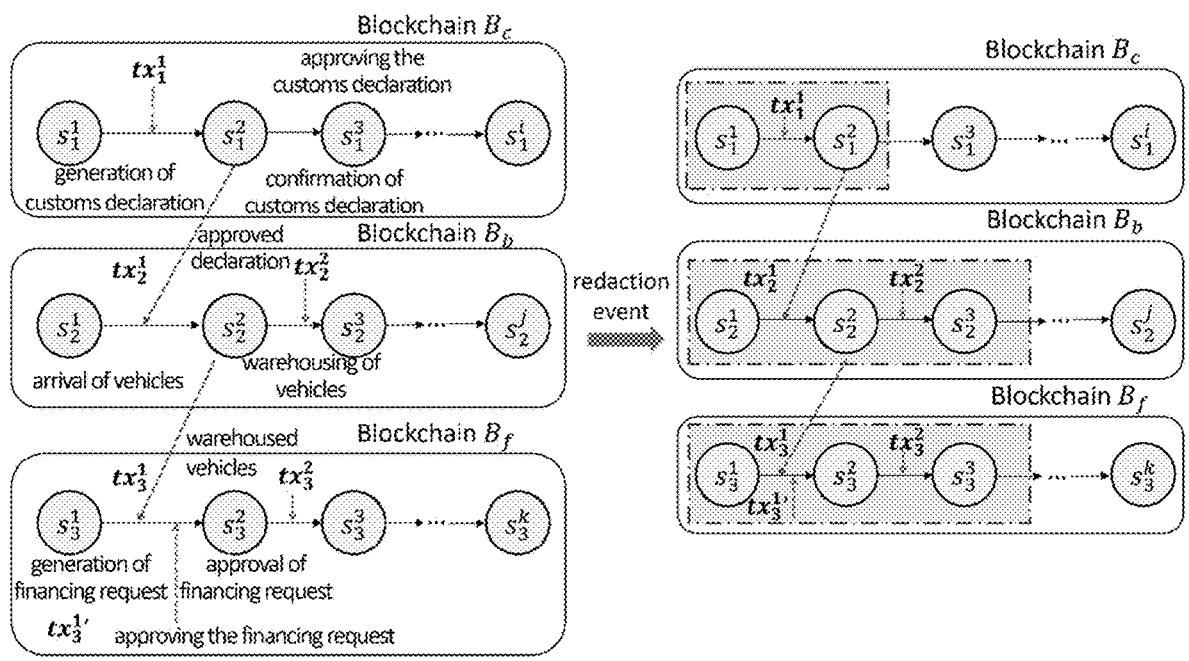
FIG. 9 shows an exemplary global state machine mapping in a cross-chain scenario of supply chain finance of imported vehicles according to an embodiment of the present disclosure.
Figure 10:
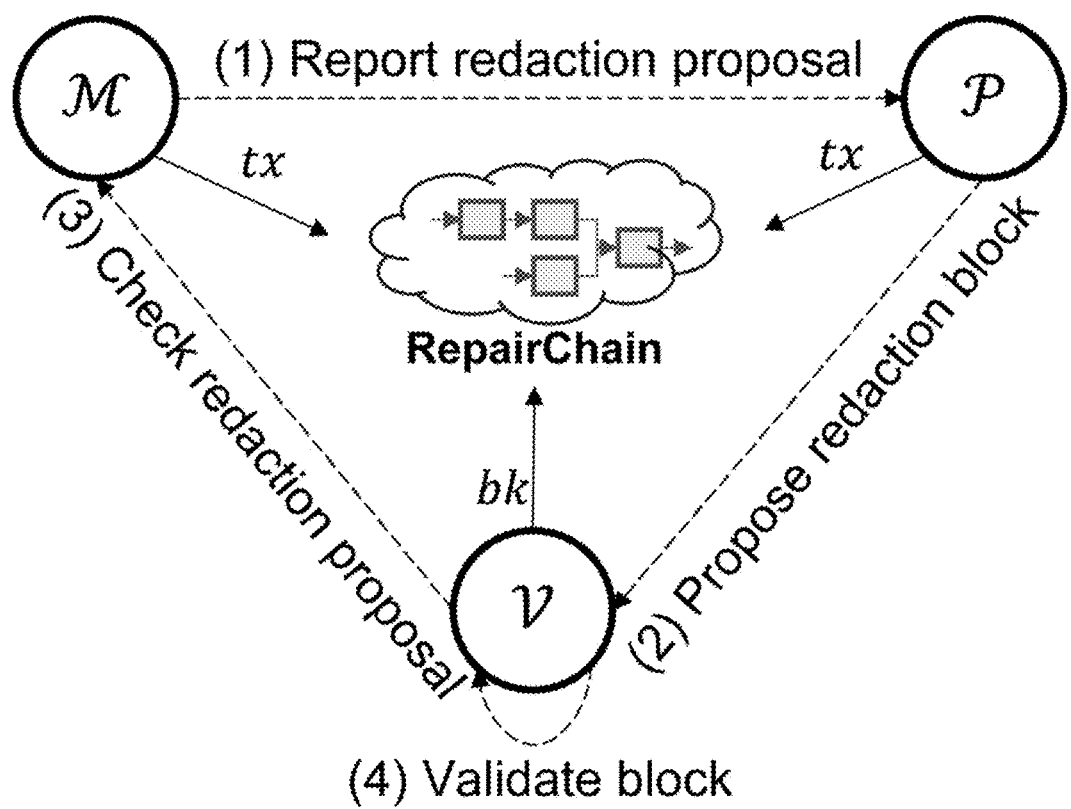
FIG. 10 illustrates interaction between the monitor, proposer and validator of the intermediary blockchain as proposed according to an embodiment of the present disclosure.
Figure 11:
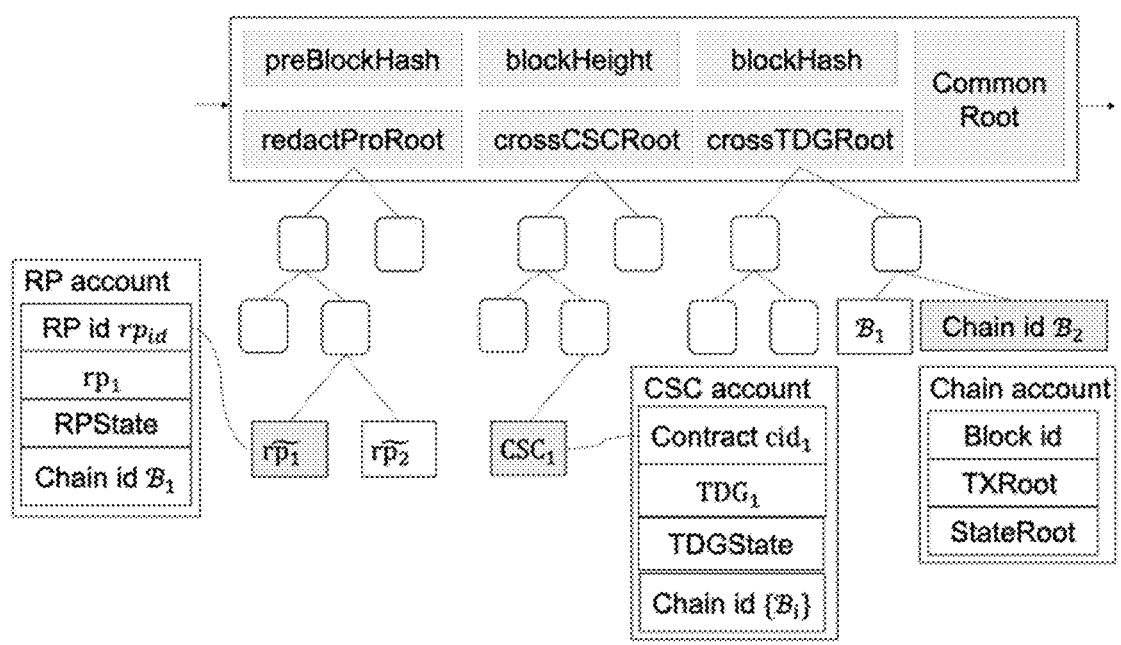
FIG. 11 illustrates architecture of blocks in the intermediary blockchain as proposed according to an embodiment of the present disclosure.

In the following, the scheme of atomic, consistent and accountable cross-chain rewriting according to preferable embodiments of the present disclosure is further explained by referring to FIG. 4 to FIG. 11. FIG. 4 is a diagram showing an exemplary architecture for implementing atomic, consistent and accountable cross-chain rewriting according to an embodiment of the present disclosure. FIG. 5 is a structural diagram of a cross-chain execution driver in the architecture of FIG. 4 according to an embodiment of the present disclosure. FIG. 6 is a structural diagram of a cross-chain redaction driver in the architecture of FIG. 4 according to an embodiment of the present disclosure. FIG. 7 shows an exemplary workflow of redaction across two different blockchains according to an embodiment of the present disclosure. FIG. 8 shows an exemplary global state machine mapping in a cross-chain smart contract according to an embodiment of the present disclosure. FIG. 9 shows an exemplary global state machine mapping in a cross-chain scenario of supply chain finance of imported vehicles according to an embodiment of the present disclosure. FIG. 10 illustrates interaction between the monitor, proposer and validator of the intermediary blockchain as proposed according to an embodiment of the present disclosure. FIG. 11 illustrates architecture of blocks in the intermediary blockchain as proposed according to an embodiment of the present disclosure.

The architecture of Cross-chain redaction of the present disclosure consists of three layers from top to bottom: the cross-chain execution and redaction driver layer, the execution and redaction layer, and the universal blockchain connector layer.

As shown in FIG. 4, the cross-chain redaction of the present disclosure can be divided into three layers:

Layer 1 is the cross-chain driver layer at a logical level. This layer manages cross-chain execution and redaction, including the CSC execution driver and redaction driver (cf. FIGS. 5 and 6).

Layer 2 is the execution and redaction layer. Here, a group of cross-chain nodes maintain a so-called cross-chain execution network and a so-called cross-chain redaction network. The networks can be regarded as a whole network which serves as an intermediary in the cross-chain scenario. We can also regard it as "a blockchain of blockchains".

Layer 3 is the blockchain connector layer. The layer offers a universal connection inference towards the underlying blockchains.

The proposed Cross-chain redaction of the present disclosure focuses on designing Layer 1 for processing the cross-chain normal and redaction transactions. The CSC execution driver is mainly responsible for executing the CSC and managing the global state and the transaction dependency. More precisely, it interacts with different parties to receive inputs and build a TDG $G_T$ for each CSC. Besides, it enforces the consistency of the global blockchain state (GBS) across of the underlying blockchains. Specially, it is considered that the CSC is executed atop the cross-chain execution network and the cross-chain redaction network.

On the other hand, the redaction driver is the key component for enabling cross-chain redaction, consisting of three parts: the universal blockchain redaction module, Intermediary blockchain $B_{RC}$, and the redaction candidate pool $Pool_{CRP}$. The universal blockchain redaction module is supported by two entities, i.e., the redaction monitoring service and the redaction execution client. The first entity is to monitor the redaction proposals from the underlying blockchains. It also enables the subsequent redaction upon receiving a proof-of-redaction event $\pi$. The second entity can be invoked by the intermediary blockchain nodes to operate redaction on the network. The intermediary blockchain is a customized permissioned blockchain for managing the cross-chain redaction states and enforcing the states to be accountable and traceable. Note that the intermediary blockchain could be integrated with the cross-chain execution network as previously mentioned, rather than rebuilding a new blockchain. In addition, $Pool_{CRP}$ is a redaction candidate pool for storing the proposed redaction proposals and updating the proposals periodically upon monitoring a certain redaction event in a certain underlying blockchain.

A probabilistic polynomial time (PPT) adversary A is utilized, that is computationally infeasible to break the cryptographic primitives utilized, such as digital signature and hash function, within a polynomial time frame. It is assumed that the underlying blockchains guarantee persistence and liveness. Cross-chain redaction of the present disclosure relies on the security of the intermediary cross-chain network. It is assumed that the majority of cross-chain nodes will behave honestly, even though some nodes may be compromised or be unreachable temporarily. The correctness and effectiveness of the redaction driver hinge on the correctness of transactions on the intermediary blockchain. Specifically, all transactions on the intermediary blockchain are ultimately confirmed through a reliable consensus protocol, such as the PoA protocol. The system is designed to defend against potential adversaries who might attempt to forge or delay a redaction proposal, or discard an accepted redaction proposal on a chain, with the intention of causing a CSC to execute incorrectly. Additionally, a synchronous communication network with low communication latency to support the efficient functioning of our system may be utilized.

Informally, cross-chain redaction of the present disclosure aims to achieve correct redaction, that is, all correlative transactions are correctly rewritten on correlative blockchains, when a redaction transaction is processed in a certain blockchain, or none of redaction transactions is processed. let $\{A:M_i \leftrightarrow M_j, i \neq j, M_i \in GM, M_j \in GM\}$ be an instance of GSM mapping for a CSC across two blockchains $B_i$ and $B_j$. Two security properties are defined: (i) Redaction Atomicity and (ii) Eventual Redaction Consistency.

Definition 6. (Redaction Atomicity). Let $rp_A$ be a redaction proposal associated with a redaction transaction $tx_A$ on the blockchain $B_i$. Let $rp_B$ be a redaction proposal on the blockchain $B_j$, according to $rp_B \leftarrow rpGen(rp_A, G_T, \Delta)$. The property of atomic redaction is satisfied, if the proposal $rp_A$ is accepted by the nodes of the blockchain $B_i$, and meanwhile, the proposal $rp_B$ is accepted by the nodes of the blockchain $B_j$ before a certain time point t, or none of the proposals is accepted before $t'(t \neq t')$. Note that a proposal is accepted or rejected, according to a pre-defined policy. The atomic redaction definition is as following:

$$(\text{check}(B_i, P_i, \upsilon_A) = \text{accept} \wedge \text{check}(B_j, P_j, \upsilon_B) =$$
$$\text{accept}) \vee (\text{check}(B_i, P_i, \upsilon_A) = \text{reject} \wedge \text{check}(B_j, P_j, \upsilon_B) = \text{reject})$$

where P is the policy for validating a redaction proposal, $\upsilon_A$ and $\upsilon_B$ are the voting results of B; and B; blockchain nodes, respectively. The check function returns "accept" or "reject".

Definition 7. (Eventual Redaction Consistency). When a redaction proposal $rp_A$ is put forward to redact a transaction tx, and subsequently modify the state from $s_i$ to $s_{i-1}$ on the blockchain $B_i$, the GSM mapping instance guides the generation of all redaction proposals $\{rpB_j\}_{j \neq i \wedge j \in [n]}$ on the correlative blockchains $\{B\}_{j \neq i \wedge j \in [n]}$, in which $rP_{B_j} \leftarrow rpGen(rp_A, G_T, \Delta)$. If $rp_{B_j}$ is accepted by a majority of nodes on $B_j$ within a pre-defined timeframe, it results in the redaction of transaction $tx_B$ and correspondingly changes the state from $s_j$ to $s_{j-1}$. The property is formalized as following:

$$\left(rp_A = (tx_A, tx_A^*) \wedge \left\{rp_{B_j} \leftarrow rpGen(rp_A, G_T, \Delta)\right\}_{j \neq i \wedge j \in [n]} \wedge P(B_i, rp_A) = \right.$$
$$\left. \text{accept} \Rightarrow \{P(B_j, rp_B) = \text{accept}\}_{j \neq i \wedge j \in [n]}\right)$$

Besides the above security properties, the redaction operations are conducted with accountability guarantees, owing to the permissioned blockchain nodes. Concretely, the majority of nodes confirm the GBS of cross-chain redaction. The nodes can check the validity of a redaction proposal and trace the responsibility of ineffective redaction transactions.

There may be two redaction types, including the transaction redaction and the state updating:

Transaction redaction. Without loss of generality, transaction redaction refers to the case of removing a specific transaction or a set of transactions included by multiple blocks in a cross-chain scenario.

State updating. The state updating type refers to the case of changing a blockchain state from st to st'. For instance, a normal transaction from a bank meaning "the bank opened an account for a manufacturer" that has been written into a blockchain. Later, the bank finds that the manufacturer is a blacklisted entity. A redaction in this instance is to rollback the created account without requiring authentication from the bank.

It is defined a predefined cross-chain redaction policy P for a redaction proposal, such that correct redaction proposals can be accepted by the underlying blockchains. The redaction policy is more complex in our cross-chain setting, compared to that of a single chain. The reasons arise from two-fold consideration. Firstly, while two redaction proposals might be independently accepted or rejected by individual blockchains, they could still be internally related in the cross-blockchain settings. Secondly, the subsequent redaction proposals need to be automatically generated in accordance with the initial proposal's policy and relevance. More precisely, the defined cross-chain redaction policy includes four requirements: (a) the proposed proposal preserves the address or the value fields of a transaction; (b) the proposal is accepted by a majority of nodes; (c) The proposal does not redact the votes of other proposals; (d) the proposal includes all transactions related to on the initial redaction transaction.

Definition 8. (Cross-chain Redaction Policy). A candidate redaction proposal rp for the blockchain $B_0$ is said to satisfy the cross-chain redaction proposal policy P, if an initial redaction proposal $rp_{ini} := (tx_0, tx_0^*)$ has been accepted in the blockchain $B_1$, i.e., $\Gamma \cdot P(rP_{ini}, B_1) = \text{accept}$, and $P(rp,B) = \text{true}$ holds if the following redaction proposal $rp := (tx_1, tx_1^*)$ satisfies $F([s_0, s_0^*], [s_1, s_1^*]) = \text{true}$. Note that $s_0 \in tx_0$, $s_0^* \in tx_0^*$, $s_1 \in tx_1$, $s_1^* \in tx_1^*$, and F is a transaction validation function.

As shown in FIG. 7, which shows the workflow of redaction across two different blockchains, the intermediary blockchain serves as an intermediary to monitor the redaction proposals, and generates redaction proposals for other involved blockchains based on a TDG. The intermediary blockchain nodes should achieve consensus on the execution of redaction transactions.

Four entities are involved: the user, the monitor, the proposer, the validator, as demonstrated in FIG. 7. The workflow is as follows:

The user of $B_1$ proposes a redaction proposal $rp_A$.

The proposal $rp_A$ then is validated by the blockchain nodes of $B_1$ via consensus-voting.

The monitor from the cross-chain network observers the redaction operation and broadcasts the operation to its own network.

The proposer coming from the cross-chain network generates another redaction proposal $rp_B$ for $B_2$.

The nodes of the intermediary blockchain play the role of validator in verifying the validity of the proposal $rp_B$, and send it to $B_2$ for validation, if the proposal $rp_B$ is valid. Upon receiving the proposal $rp_B$, the blockchain nodes of $B_2$ validate the proposal, according to a redaction policy $P(rp_B, B_2)$. Once $rp_B$ is accepted by $B_2$, the state of $G_T$ will be updated by the nodes of intermediary blockchain.

With the execution of the protocol, six states for a CSC execution are defined: Init, Inited, Executing, Executed, Redacting, Redacted. The first four states represent that the cross-chain transactions are normally executed. The latter two states are used only for redaction transactions on certain blockchain. Correspondingly, if the state of $tx_1^1$ is Redacted, and the state is validated by the nodes of blockchain $B_1$, then all subsequent dependent transactions should also be redacted.

From the perspective of distributed databases, each blockchain can be viewed as a local database that contributes to a larger global database in a multi-chain setting. Like traditional databases that support operations like updating and deletion, blockchains may also require the capability of rewriting, which allows for modifications to be made. However, the modifications become more complex to be made in cross-chain scenarios, compared to those faced by a single blockchain. Specifically, when a transaction or a state has been rewritten in a blockchain, it is necessary to track and update the dependent transactions or states of the other blockchains, for maintaining a consistent view cross multiple blockchains.

To address the above issues, the proposed protocol for cross-chain redaction of the present disclosure enables four key functionalities:

(i) Consensus on Cross-chain State. In the Layer 2, a set of actors maintain a cross-chain network, as an intermediary blockchain for coordinating the underlying blockchains. The blockchain utilizes a widely-studied consensus protocol named proof-of-authority (PoA) that has been integrated in Ethereum. In particular, a designated number of actors have been authorized the power to validate transactions.

(ii) Monitoring Redaction Transactions. The actors are required to monitor redaction transactions from all underlying blockchains, in addition to normal transactions. A redaction transaction is denoted as a tuple rp=<$B_i$, (bh,txid,x),des>. Herein, $B_i$ is the index of the blockchain. bh refers to a block header which contains a transaction txid to be redacted. txid is the hash of the transaction. x refers to the new data to replace the data of the transaction. des refers to the description of the redaction proposal, i.e., state update from st to st'.

(iii) Redaction Proposal Generation. Upon monitoring the occurrence of redaction transactions, the actors generate a set of redaction proposals that involve all related transactions depending on the redacted transactions. Note that the redaction proposals are generated, according to a redaction policy, and finally a majority of actors agree on the generated proposals.

(iv) Redaction Proposal Validation. A generated redaction proposal will be validated by a group of redaction validators who are randomly selected from cross-chain redaction nodes, by using a random election algorithm. To be specific, the proposal is accepted or rejected based on a consensus-based decision algorithm, denoted as decision(rp), with an output of 'accept' or 'reject'. A redaction witness regarding each redaction proposal is defined as w=<$B_i$,bh,H(rp),des,b,pf>. Herein, b refers to the decision flag, and pf refers to a proof with regard to the correctness of the redaction proposal. The witness lastly is verified by the nodes of a permissioned blockchain.

The cross-chain execution driver is a logic-level concept for executing CSC and maintaining the GBS consistency.

A Cross-chain Smart Contract (CSC) defines cross-chain transaction execution logic that enables blockchain interoperability. Atomic swapping can be considered a form of a CSC as it facilitates cryptocurrency exchange among users who hold different tokens across different blockchains. However, it is important to note that atomic swapping does not strictly conform to the definition of a smart contract. In general, a CSC runs atop several different blockchains. It calls or reads data in a source chain and executes the CSC off the blockchain. After that, it utilizes the results to act on a target chain. The execution of a CSC can be recognized as several transactions that will be written in blockchains.

The execution ordering of a CSC is depicted as a TDG, (cf. FIG. 8). The TDG explicates that a certain transaction should be executed before (or after) other transactions in the CSC. In addition, the cross-chain execution driver maintains a relation of several state machines within different permissioned blockchains, which is conceptualized as the GMS mapping.

In general, blockchain is a never-halting machine that its states update continuously upon receiving users' inputs. For example, Ethereum is a transaction-based "state" machine. The so-called Ethereum world state is able to manage the states of the external account and contract account. The activities of transactions and consensus will change the Ethereum world state correspondingly. The GBS in the current work represents the global states across multiple permissioned blockchains in a specific timestamp. It can be regarded as a world state, in which different blockchains show the states dependency, due to the existence of CSC.

A TDG corresponding to the GBS transition starting from an initial state can guide the next-step execution of a CSC. However, it is not straightforward to obtain a completely consistent GBS in a cross-chain setting, due to the lack of a common clock among different blockchains. A GBS detection mechanism and a time synchronization mechanism may be designed, including blockchain state updating and rewriting, so as to maintain the states across blockchains and finally form a consistent GBS.

As depicted in FIG. 8, there are three blockchain systems $B_1$, $B_2$, $B_3$, where the states can be denoted as $\{s_1^1, s_1^2, \ldots, s_1^i\}$, $\{s_2^1, s_2^2, \ldots, s_2^i\}$, $\{s_3^1, s_3^2, \ldots, s_3^i\}$, respectively. Each blockchain maintains its own states based on a consensus protocol. The tx represents a transaction posted by a blockchain user to trigger the state transition on the blockchain, e.g., changing the state from $s_1^1$ to $s_1^2$ in $B_1$. At the same time, the transaction, e.g., $tx_2^1$ is posted by another blockchain user who detects that it was affected by the previous state transition on $B_1$. The posted transaction could trigger the state transition on $B_2$. Then, on the left part of FIG. 8, the global blockchain state is updated from the initial states from $(s_1^1, s_2^1, s_3^1)$ to $(s_2^2, s_2^2, s_3^2)$, which is called as temporary global state.

Next, reference is further made to a real-world case in FIG. 9 to demonstrate the dependency of state transition cross different chains. The case elaborates a cross-chain scenario of supply chain finance of imported vehicles to further explain global blockchain state consistency. In the scenario, three blockchains are built, including (1) the blockchain $B_b$ maintaining the business of imported vehicles, (2) the blockchain $B_c$ storing the information about customs declaration, and (3) the blockchain $B_f$ maintaining the financing records with respect to the vehicles that are exactly imported. The FIG. 9 demonstrates the correlative state transition among the three blockchains. It is assumed that three correlative lines of state transition are involved. Overall, state transition on Br (e.g., from $s_3^1$ regarding the generation of financing request to $s_3^2$ regarding the approval of financing request) depends on the state $s_2^2$ of $B_b$. Meanwhile, the state transition (e.g., from $s_2^1$ regarding arrival of vehicles to $s_2^2$ regarding warehousing of vehicles) on $B_b$ similarly depends on the state $s_1^2$ of $B_c$.

Based on the above scenario example, if the GSM mapping (cf. Definition 5) across different blockchains can be previously defined and its authenticity can be guaranteed, then the consistent GBS could be achieved within a specific time slot (based on the time synchronization mechanism).

Definition 9. (Global Blockchain State Consistency). Denote n different blockchain systems $\{B_1, \ldots, B_n\}$ corresponding to n finite state machines. Let a mapping policy map describe the pre-defined mapping relationships between the state machines, and let a CSC $C_i$ run over the multiple different chains. Let $S_i=\{s_i^1, \ldots, s_i^{d_i}, \ldots, s_i^{\varepsilon_i}\}$ denote a sequence of states of several state machines, where $1 \le d_i \le \varepsilon_i, i \in [n]$, and $\varepsilon_i$ is the total number of states related to $C_i$. A GBS mapping satisfies the GBS consistency, if map:=$\{H((s_1^{d_1}, \ldots, s_n^{d_{\in n}}), tx)=1, s_i^{d_i} \in S_i\}$ where tx denotes a set of confirmed transactions on the different blockchains.

In the above definition, the validation function $H(\cdot)$ in map is used to check whether the current GBS is consistent to the pre-defined mapping relation. According to the TDG related to the CSC, the state transition is implemented following by the policy map. As shown in FIG. 8, $H((s_1^2, s_2^2, s_3^2), (tx_1^1, tx_2^1, tx_3^1))=1$. These three confirmed transactions $(tx_1^1, tx_2^1, tx_3^1)$ have strict dependency relationships, and they keep the GBS of $C_i$ in a temporary global consistency. Note that the temporary global consistency is also predefined by the maintaining nodes of the blockchain systems.

It is noted that the GSM mapping is never modified during the interactive process of multiple blockchains. It can be updated with the agreement of all involved blockchains for a CSC. In particular, as depicted in the right part of FIG. 7, rewriting the transaction $tx_1^1$ triggers that the state $s_1^2$ is rollback to $s_1^1$ on $B_1$. Accordingly, a redaction proposal $rp_2$ should be posted on $B_2$. Similarly, a redaction proposal $rp_3$ that triggers the state changing from $s_3^2$ to $s_3^1$ on $B_3$.

Similar to the classic distributed systems, cross-chain communication using the GSM mapping can potentially encounter deadlock issues. Ensuring the temporary global consistency of the GBS relies on the active participation of all blockchains. If a certain blockchain fails to post a transaction that facilitates the GBS's temporary global consistency, it may result in an inaccurate state of the GSM mapping. To address this, dedicated watching services should be implemented to continuously monitor redactions on other blockchains. These services will take the necessary actions, such as rewriting transactions, to maintain the correctness and consistency of the GBS.

Standing on top of the concepts of TDG and GBS in the previous section, the cross-chain redaction driver is provided with three logical components: the universal blockchain redaction module, the intermediary blockchain, and the redaction candidate pool. The Redaction Monitoring Service (RMS) and the Redaction Execution Client (REC) in the universal blockchain redaction module interact with each other to complete redaction. The RMS can monitor the redaction operations and the state updates on the underlying blockchains. Once a redaction operation is captured, the RMS broadcasts it, which enables the REC on the other blockchains to generate the subsequent redaction proposals. Intermediary blockchain is a customized permissioned blockchain for ensuring the atomicity, consistency, and accountability of the global redaction operations. Each of the underlying blockchains maintains a redaction candidate pool.

During the execution of redaction, a cross-chain redaction transaction is generated, along with the state transition. Specifically, five states are involved, such as Init, Inited, Redact, Redacted, Closed. The first state Init denotes the initialization of cross-chain redaction that a redaction proposal rp is under processing in a blockchain. After the proposal rp is accepted, the Init state is transited into Inited. Then, when subsequent redaction transactions caused by rp are under processing, the Inited state moves to the Redact state. Once all related transactions have been redacted, the state transits into the Redacted state. It is noted that the intermediary blockchain nodes generate a signature for each state transition for attesting the accountability.

The intermediary blockchain facilitates the execution of a CSC according to a TDG. With the intermediary blockchain, an arbitrary user can verify the correctness of the execution of the cross-chain redaction. The intermediary blockchain have customized block structure and consensus nodes. On the intermediary blockchain, there are three key roles responsible for enforcing generating trustful redaction proposals and ensuring their successful execution. These roles, as depicted in FIG. 10, have the following responsibilities:

Monitor: A monitor (identified by M) is a party who monitors the redaction candidate pool of each connected blockchain and reports an event of the redaction operation (cf. Step (1) of FIG. 10) happened in the underlying blockchains. Generally, to guarantee the correctness of redaction reporting against the single point of failure, we require an enough number of monitors. If the majority of monitors have reported the same redaction event, along with a valid signature, then this redaction proposal can trigger an initialization of cross-chain redaction proposal on the intermediary blockchain. Additionally, the monitor tracks the redaction outcomes on each correlative blockchain. If a certain redaction failed, the monitor reproduces the redaction proposal for the blockchain, or rollback the states corresponding to all redaction transactions.

Proposer: A proposer (identified by P) is a party who generates redaction proposals for the underlying blockchains according to the monitoring events of M (cf. Step (2) of FIG. 10). It proposes redaction proposals for other correlative blockchains correspondingly, on top of the principles of GSM mapping and TDG that specifies the execution order of transactions. P then sends the generated redaction proposals to the validators for verification.

Validator: A validator (identified by V) is a party who is in charge of maintaining the intermediary blockchain. The validators generate a new block by collecting the transactions uploaded by M and P. They essentially act as full nodes to receive, validate and broadcast transactions and blocks (cf. Step (3) and (4) of FIG. 10), according to our chosen consensus protocol. In addition, V interacts with M to confirm the validity of the initial redaction proposal.

Block confirmation and generation can be accomplished within an appointed time interval through authorized consensus nodes (i.e., validators). In particular, each underlying blockchain can choose a node as a validator on the intermediary blockchain. Also, the role of V and P can be acted by the authorized blockchain nodes.

As illustrated in FIG. 11, besides the common fields of a block, the intermediary blockchain has two additional Merkle tree roots: redactProRoot and crossTDGRoot. The redactProRoot is a type of Merkle tree where the leaf nodes are the redaction proposals chosen from the redaction candidate pool of the underlying blockchains. Each leaf node can be denoted as a tuple: $\widetilde{rp}:=\{B_i, rp, RPstate\}$; where RPstate refers to the state of a redaction proposal rp. There are three possible states Voting, Accept, Reject. Besides, crossTDGRoot refers to the root of a Merkle tree that maintains the states of multiple TDGs. As mentioned earlier, a TDG $G_T$ reveals the execution ordering of a CSC. When a redaction proposal is put forward, the state of $G_T$ goes into the Redact state. During the redaction procedure, the $G_T$ update will generate the transaction $\widetilde{TDG}$ by M or P, where $\widetilde{TDG}:=\{B_i, TDG, TDGstate\}$. The redaction proposal to be executed on the intermediary blockchain will be given by the universal blockchain-redaction module. Contrary to the Hyperservice that the stateRoot only stores the hash of transactions related to the CSC, it stores a set of block headers that serve as the checkpoint for verifying the redaction proposal.

The intermediary blockchain is designed with supporting general purpose smart contracts. That is, smart contracts are introduced to enable Turning-complete redaction operations. Specifically, when a monitor M detects a redaction proposal, he can initialize a CSC called TDGRedactionContract. The CSC receives a redaction proposal rp as an input from M (or P), which triggers the global state transition. The proposer P is responsible for generating other redaction proposals involving the transactions correlated to rp. After these proposals being verified by the validators V, other blockchain nodes would follow the redaction proposals to edit the transactions.

The transaction structure can be denoted as a five-element tuple: tx:={tx.from,tx.to,tx.value,tx.time,tx.data), where tx.from,tx.to refer to the address fields of sender(s) and receiver(s), tx.value refers to the value field of transaction, and tx.data refers to the data field that can store the digest of a redaction.

The intermediary blockchain nodes verify two special Merkle tree roots including redactProRoot, crossTDGRoot, to accomplish block verification. It starts with a monitor M who submits a redaction transaction along with a proof θ containing several k blocks, where k is set as a security parameter. Each blockchain node on the intermediary blockchain requests the proof and verifies the validity of the k blocks.

The intermediary blockchain nodes need to verify the correctness of each redaction transaction related to a $\widetilde{TDG}$, according to both of TDG and GBS. For instance, if a redaction proposal rp=($tx_1^1$, $\widetilde{tx_1^1}$) is initialized, then a differential comparison algorithm diff($tx_1^1$, $\widetilde{tx_1^1}$) is leveraged to deduce the state transition, i.e., $s_1^2 \to s_1^1$. Therefore, according to the pre-defined verification function H of the GSM mapping, it is educed the state rollback as $s_2^2 \to s_2^1$. Combined with the transaction $tx_2^1$, a redaction transaction $\widetilde{tx_2^1}$=redactTxGen($tx_2^1$,($s_2^2,s_2^1$)), is calculated' where redactTxGen(·) is to generate a redaction transaction, based on the state rollback $s_2^2 \to s_2^1$ as well as the semantic comparison of diff($tx_2^1$, $\widetilde{tx_2^1}$).

The Redaction Monitoring Service (RMS) is implemented by employing a set of monitors. The role of monitor M captures the redaction transactions of the underlying blockchains in an "observer pattern" fashion. The observer pattern is a software design pattern, in which a subject maintains a set of observers and notifies the observers of any state modification. Besides monitoring the redaction transactions, the set of monitors also monitor the redaction events that may cause the GBS inconsistency. Once capturing such redaction events, M triggers the cascading state updating of correlative blockchains. Specifically, for ensuring the GBS consistency, it is defined a GBS monitoring service to detect the events that can affect the GBS, e.g., state updating (cf. transaction recording) or state rollback (cf. transaction rewriting). The RMS runs concurrently with the underlying blockchains and does not alter the running sequence of the transaction. It follows the ordering of a TDG to revoke the state transition in cascade. Once the RMS detects that a proposal rp is proposed to redact a transaction. For example, rp:={$tx_1^1$, $\widetilde{tx_1^1}$} revokes the state transition that $\widetilde{tx_1^1}$ is used to replace $tx_1^1$ for making the state $s_1^2$ go back to the initial state $s_1^1$. At this point, the RMS notices a redaction node to initialize a redaction transaction on the intermediary blockchain by uploading rp and its TDG $G_{TDG}$. Once the redaction proposal rp has been finally confirmed in blockchain $B_1$, the RMS uploads the redaction proof θ:={B*, ($B_\tau$, ... $B_{\tau+k}$}, H(rp)} and $\widetilde{tx_1^1} \in B^*$ to show that $B_1$ has included rp into the first transaction of a block for k blocks. Herein, B* is a rewriting block that contains $\widetilde{tx_1^1}$. ($B_\tau$, ... , $B_{\tau+k}$) are a sequence of newly created k blocks that include the proposal rp. k is a pre-defined security parameter.

The redaction execution client is a gateway for the monitor M (or the proposer P) to interact with the intermediary blockchain. It is a light-weight client that is not required to undertake complex tasks. It is in charge of providing two functionalities: (i) helping the monitor M or the proposer P to upload transactions to the RMS; (ii) generating the subsequent redaction proposals in the place of the proposers. In particular, a proposer can submit a request to generate a proposal by sending a redaction proposal that has been executed.

Additionally, the redaction execution clients play the role of scheduling the execution of the redaction proposals on the intermediary blockchain based on a redaction ordering service. The service ensures that the redaction proposals of a CSC are executed following the TDG and GBS mapping.

Figure 12:
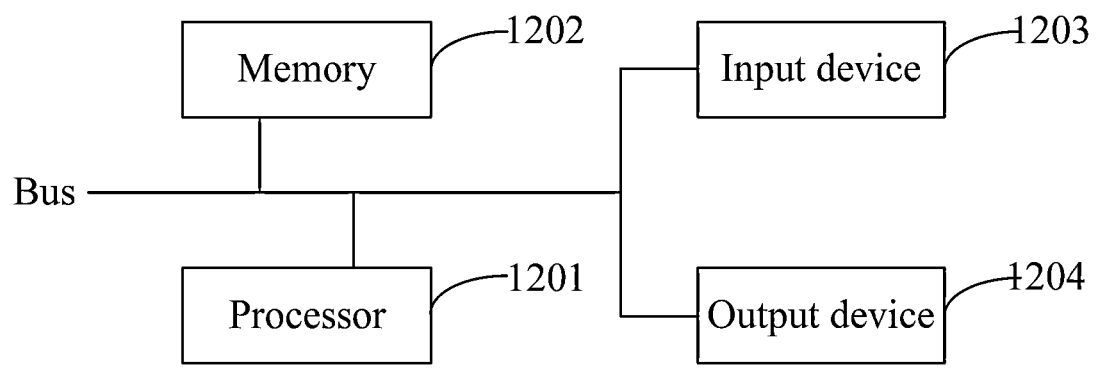
FIG. 12 is a structural block diagram of a device for atomic, consistent and accountable cross-chain rewriting according to an embodiment of the present disclosure.

FIG. 12 is a structural block diagram of a device for atomic, consistent and accountable cross-chain rewriting according to an embodiment of the present disclosure. As shown in FIG. 12, the device may include: a processor 1201, a memory 1202, an input device 1203 and an output device 1204.

The image processing device may include one or more processors 1201, and one processor is shown in FIG. 12 as an example. In some embodiments of the present invention, the processor 1201, the memory 1202, the input device 1203 and the output device 1204 may be connected by a bus or in other ways. The connection via a bus is taken as an example in FIG. 12.

The memory 1202 may be used to store software programs and modules, and the processor 1201 executes various functional applications and data processing of the image processing device by running software programs and modules stored in the memory 1202. The memory 1202 may mainly include a program storage area and a data storage area. The program storage area may store an operating system, an application program required for at least one function, and the like. Additionally, the memory 1202 may include a high-speed random access memory, and may also include a non-volatile memory, such as at least one magnetic disk storage device, flash memory device, or other volatile solid state storage device. The input device 1203 may be used to receive input numerical or character information, and generate signal input related to user settings and function control of the image processing device.

Specifically in this embodiment, the processor 1201 loads the executable files corresponding to the processes of one or more application programs into the memory 1202 according to the following instructions, and the processor 1201 executes the application programs stored in the memory 1202, thus to realize various functions of the image processing device.

It should be noted that, in this document, relational terms such as "first" and "second" etc. are only used to distinguish one entity or operation from another entity or operation, and do not necessarily require or imply there is such actual relationship or sequence between these entities or operations. Moreover, the terms "comprising", "comprises" or any other variation thereof are intended to encompass a non-exclusive inclusion such that a process, method, article or device that includes a list of elements includes not only those elements, but also includes other elements not explicitly listed, or elements inherent to such a process, method, article or apparatus. Without further limitation, an element defined by the phrase "comprising a . . . " does not preclude the presence of additional identical elements in a process, method, article or apparatus that includes the element.

The above embodiment is a preferred embodiment of the invention, which is not intended to limit the scope of the present invention. Any changes, modifications, substitutions, combinations, simplifications without departing from the spirit and principle of the invention shall fall within the scope of the invention.

What is claimed is:

1. A computer-implemented method for atomic, consistent and accountable cross-chain rewriting, applicable for a blockchain network comprising a set of correlative blockchains, the method comprising:
    in response to a user redaction proposal for any of the correlative blockchains, generating a set of correlative redaction proposals that involve all related transactions depending on a target transaction to be redacted by the user redaction proposal, based on a transaction dependency graph representing a dependency relationship of transactions, wherein at least one of the transactions in the transactions is to be redacted by the user redaction proposal;
    validating the user redaction proposal and the correlative redaction proposals, according to a predefined cross-chain redaction policy;
    calling the correlative blockchains for executing the validated redaction proposals;
    updating the transaction dependency graph in response to execution of the validated redaction proposals; and
    constructing an intermediary blockchain, wherein the intermediary blockchain comprises a monitor node configured for monitoring candidate redaction proposal pools for the correlative blockchains to detect the user redaction proposal, a proposer node configured for generating the set of correlative redaction proposals, and a validator node configured for generating new blocks of the intermediary blockchain by collecting transactions uploaded by the monitor and the proposer.

2. The method according to claim 1, further comprising:
    monitoring the candidate redaction proposal pools for the correlative blockchains, to detect the user redaction proposal.

3. The method according to claim 1, further comprising:
    in response to a cross-chain communication enabled smart contract, determining transactions involved by the cross-chain communication enabled smart contract;
    executing the cross-chain communication enabled smart contract by executing the transactions involved by the cross-chain communication enabled smart contract in a set of blockchains; and
    determining the set of blockchains as the set of correlative blockchains,
    wherein the user redaction proposal is aimed for redacting one of the transactions involved by the cross-chain communication enabled smart contract.

4. The method according to claim 3, wherein the transaction dependency graph specifies dependency and execution order of the transactions involved by the cross-chain communication enabled smart contract.

5. The method according to claim 1, further comprising:
    generating a global state mapping of the set of correlative blockchains, based on a set of original states associated with the set of correlative blockchains before executing the cross-chain communication enabled smart contract and a set of transformed states associated with the set of correlative blockchains after executing the cross-chain communication enabled smart contract.

6. The method according to claim 5, further comprising:
    for any one of the validated redaction proposals, rejecting the redaction proposal if the redaction proposal triggers changing in the global state mapping of the set of correlative blockchains.

7. The method according to claim 1, wherein generating the set of correlative redaction proposals that involve all related transactions depending on the user redaction proposal comprises:
    determining the target transaction for which the user redaction proposal is directed to;
    determining a first sub-transaction of the target transaction from the transaction dependency graph and determining a first blockchain associated with the first sub-transaction, wherein execution of the first sub-transaction depends on execution of the target transaction;
    deducing a first redaction transaction corresponding to the first sub-transaction; and
    generating a first redaction proposal based on the first redaction transaction and the first blockchain.

8. The method according to claim 7, further comprising:
    sequentially generating remaining correlative redaction proposals based on the first redaction proposal from the transaction dependency graph.

9. The method according to claim 1, further comprising:
    if one of the validated redaction proposals is rejected, calling the correlative blockchains to reject all of the validated redaction proposals.

10. A system for atomic, consistent and accountable cross-chain rewriting comprising:
    a blockchain network comprising a set of correlative blockchains; and
    an intermediary blockchain capable of calling the correlative blockchains;
    wherein the intermediary blockchain comprises:
    a proposer node comprising a processor configured for, in response to a user redaction proposal for any of the correlative blockchains, generating a set of correlative redaction proposals that involve all related transactions depending on a target transaction to be redacted by the user redaction proposal, based on a transaction dependency graph representing a dependency relationship of transactions, wherein at least one of the transactions in the transactions is to be redacted by the user redaction proposal; and
    a validator node comprising a processor configured for validating each of the user redaction proposal and the correlative redaction proposals, according to a predefined cross-chain redaction policy, to allow calling the correlative blockchains for executing the validated redaction proposals;
    wherein the transaction dependency graph is updated in response to execution of the validated redaction proposals.

11. The system according to claim 10, wherein the intermediary blockchain further comprises a monitor node comprising a processor configured for monitoring candidate redaction proposal pools for the correlative blockchains, to detect the user redaction proposal.

12. The system according to claim 10, further comprising a controller configured for:
   in response to a cross-chain communication enabled smart contract, determining transactions involved by the cross-chain communication enabled smart contract;
   executing the cross-chain communication enabled smart contract by executing the transactions involved by the cross-chain communication enabled smart contract in a set of blockchains; and
   determining the set of blockchains as the set of correlative blockchains,
   wherein the user redaction proposal is aimed for redacting one of the transactions involved by the cross-chain communication enabled smart contract.

13. The system according to claim 12, wherein the transaction dependency graph specifies dependency and execution order of the transactions involved by the cross-chain communication enabled smart contract.

14. The system according to claim 10, further comprising a controller configured for:
   generating a global state mapping of the set of correlative blockchains, based on a set of original states associated with the set of correlative blockchains before executing the cross-chain communication enabled smart contract and a set of transformed states associated with the set of correlative blockchains after executing the cross-chain communication enabled smart contract.

15. The system according to claim 14, wherein each of the correlative blockchians is configured for:
   for one of the validated redaction proposals, rejecting the redaction proposal if the redaction proposal triggers changing in the global state mapping of the set of correlative blockchains.

16. The system according to claim 10, wherein the proposer node is further configured for:
   determining the target transaction for which the user redaction proposal is directed to;
   determining a first sub-transaction of the target transaction from the transaction dependency graph and determining a first blockchain associated with the first sub-transaction, wherein execution of the first sub-transaction depends on execution of the target transaction;
   deducing a first redaction transaction corresponding to the first sub-transaction; and
   generating a first redaction proposal based on the first redaction transaction and the first blockchain.

17. The system according to claim 16, wherein the proposer node is further configured for:
   sequentially generating remaining correlative redaction proposals based on the first redaction proposal from the transaction dependency graph.

18. The system according to claim 10, wherein the correlative blockchains are configured to reject all of the validated redaction proposals if one of the validated redaction proposals is rejected.

* * * * *